(12) United States Patent
Gugumus

(10) Patent No.: US 7,628,936 B2
(45) Date of Patent: Dec. 8, 2009

(54) STABILIZER MIXTURES

(75) Inventor: François Gugumus, Allschwil (CH)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 90 days.

(21) Appl. No.: 11/452,143

(22) Filed: Jun. 13, 2006

(65) Prior Publication Data

US 2006/0226394 A1  Oct. 12, 2006

Related U.S. Application Data

(63) Continuation of application No. 11/051,455, filed on Feb. 4, 2005, now abandoned, which is a continuation of application No. 10/257,339, filed as application No. PCT/EP01/05864 on May 22, 2001, now abandoned.

(30) Foreign Application Priority Data

May 31, 2000  (EP) .................................. 00810482
Feb. 14, 2001  (EP) .................................. 01810148

(51) Int. Cl.
C09K 15/16  (2006.01)
C09K 15/18  (2006.01)

(52) U.S. Cl. .................. 252/401; 252/182.29; 524/100; 524/102; 524/103

(58) Field of Classification Search .................. 252/401
See application file for complete search history.

(56) References Cited

U.S. PATENT DOCUMENTS

| | | | |
|---|---|---|---|
| 4,692,486 A | | 9/1987 | Gugumus .................... 524/100 |
| 4,720,356 A | * | 1/1988 | Chu ............................ 252/586 |
| 4,785,034 A | * | 11/1988 | Gaku et al. .................... 524/99 |
| 4,863,981 A | | 9/1989 | Gugumus ..................... 524/97 |
| 4,957,953 A | | 9/1990 | Kikkawa et al. ............... 524/99 |
| 5,340,857 A | * | 8/1994 | Van Gemert ................ 524/110 |
| 5,455,289 A | * | 10/1995 | Caselli ........................ 523/223 |
| 5,536,572 A | * | 7/1996 | Braca et al. ................. 428/364 |
| 5,679,733 A | | 10/1997 | Malik et al. .................. 524/99 |
| 5,719,217 A | | 2/1998 | Gugumus .................... 524/100 |
| 5,859,073 A | * | 1/1999 | Pfaendner et al. ............. 521/48 |
| 5,888,615 A | * | 3/1999 | Mascarenhas et al. ....... 428/141 |
| 5,919,399 A | | 7/1999 | Gugumus .................... 252/403 |
| 5,981,674 A | * | 11/1999 | Schombourg et al. ....... 526/279 |
| 6,015,849 A | | 1/2000 | Gugumus .................... 524/100 |
| 6,028,129 A | * | 2/2000 | Pfaendner et al. ............. 524/99 |
| 6,512,029 B1 | | 1/2003 | Gugumus ..................... 524/97 |

FOREIGN PATENT DOCUMENTS

| | | |
|---|---|---|
| EP | 0632092 | 1/1995 |
| EP | 0723990 | 7/1996 |
| GB | 2328210 | 2/1999 |
| WO | 00/18833 | 4/2000 |

\* cited by examiner

*Primary Examiner*—Joseph D Anthony
(74) *Attorney, Agent, or Firm*—Shiela A. Loggins

(57) ABSTRACT

A stabilizer mixture containing the components (A), (B) and (C) wherein
component (A) is for example
a compound of the formula (A-1)

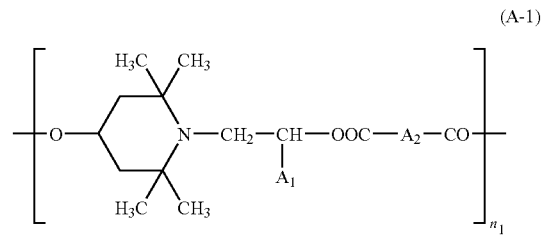

wherein
$A_1$ is hydrogen or $C_1$-$C_4$alkyl,
$A_2$ is a direct bond or $C_1$-$C_{10}$alkylene, and
$n_1$ is a number from 2 to 50;
component (B) is a low molecular weight sterically hindered amine compound containing a group of the formula (I) or (II); and

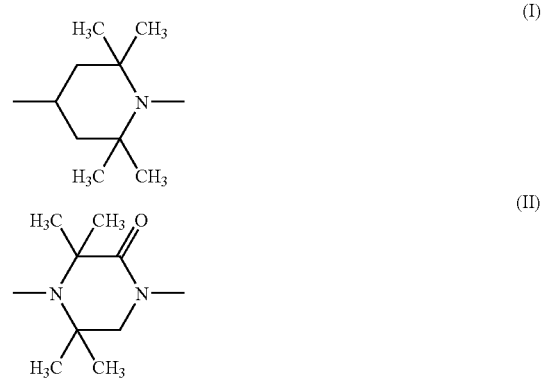

component (C) is a high molecular weight sterically hindered amine compound containing a group of the formula (I);
with the proviso that components (A), (B) and (C) are different.

12 Claims, No Drawings

STABILIZER MIXTURES

This is a continuation of U.S. Ser. No. 11/051,455, files Feb. 4, 2005, now abandoned and incorporated entirely by reference, which is a continuation of U.S. Ser. No. 10/257,339, filed Oct. 10, 2002, now abandoned, which is a 371 of PCT/EP01/05864 filed May 22, 2001.

The present invention relates to a stabilizer mixture containing a specific sterically hindered amine ester or amide, a low molecular weight sterically hindered amine and a high molecular weight sterically hindered amine.

Stabilizer mixtures containing blends of sterically hindered amines are for example described in U.S. Pat. No. 4,692,468, U.S. Pat. No. 4,863,981, U.S. Pat. No. 5,719,217, U.S. Pat. No. 5,919,399, U.S. Pat. No. 5,965,643, U.S. Pat. No. 5,980,783, U.S. Pat. No. 6,015,849 and U.S. Pat. No. 6,020,406.

The present invention relates to a stabilizer mixture containing the components (A), (B) and (C) wherein component (A) is a compound of the formula (A-1)

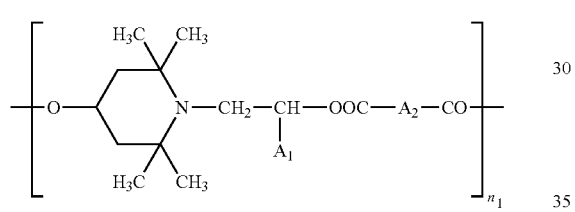

(A-1)

wherein $A_1$ is hydrogen or $C_1$-$C_4$alkyl,
$A_2$ is a direct bond or $C_1$-$C_{10}$alkylene, and
$n_1$ is a number from 2 to 50;

at least one compound of the formulae (A-2-a) and (A-2-b)

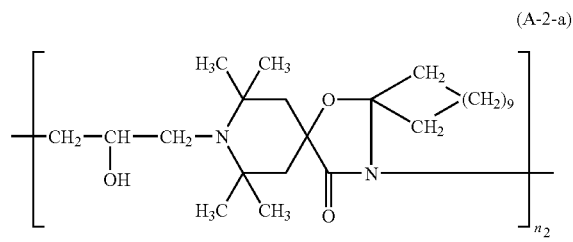

(A-2-a)

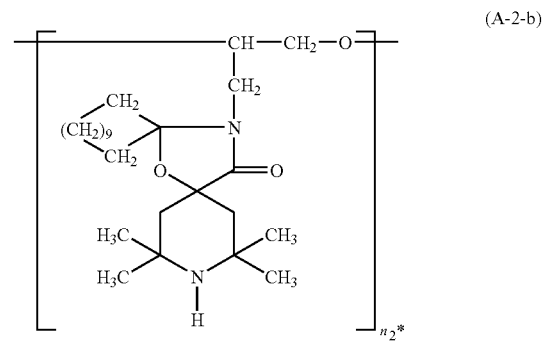

(A-2-b)

wherein $n_2$ and $n_2^*$ are a number from 2 to 50;
a compound of the formula (A-3)

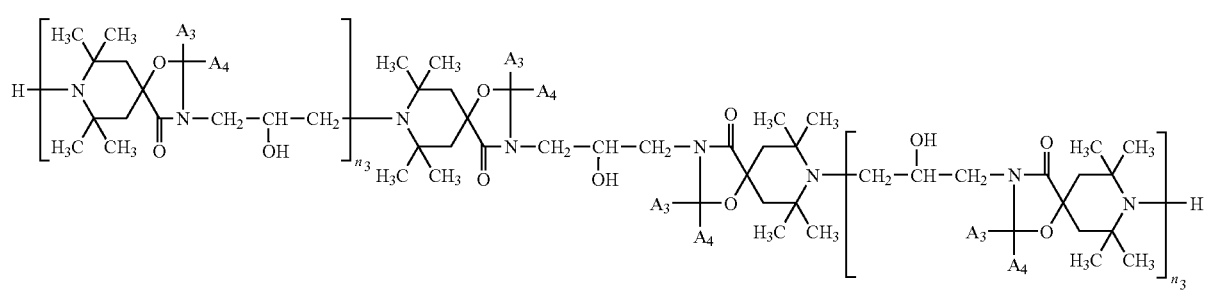

(A-3)

wherein $A_3$ and $A_4$ independently of one another are hydrogen or $C_1$-$C_8$alkyl, or $A_3$ and $A_4$ together form a $C_2$-$C_{14}$alkylene group, and the variables $n_3$ independently of one another are a number from 1 to 50; or a compound of the formula $(A_4)$

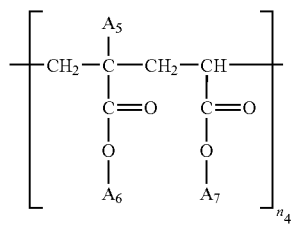

wherein $n_4$ is a number from 2 to 50, $A_5$ is hydrogen or $C_1$-$C_4$alkyl, the radicals Ar and $A_7$ independently of one another are $C_1$-$C_4$alkyl or a group of the formula (a-I)

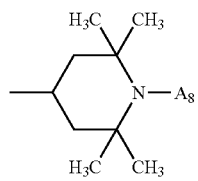

wherein $A_8$ is hydrogen, $C_1$-$C_8$alkyl, O, —OH, —$CH_2CN$, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, with the proviso that at least 50% of the radicals $A_7$ are a group of the formula (a-I);

component (B) is a low molecular weight sterically hindered amine compound containing a group of the formula (I) or (II); and

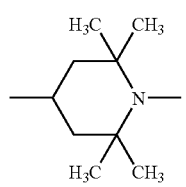

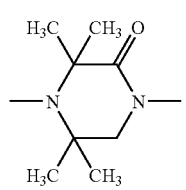

component (C) is a high molecular weight sterically hindered amine compound containing a group of the formula (I);

with the proviso that components (A), (B) and (C) are different.

Preferably the compounds of component (B) have a molecular weight up to 1,000 g/mol, for example 155 to 800 g/mol or 155 to 1,000 g/mol or 300 to 800 g/mol or 300 to 1,000 g/mol.

Preferred high molecular weight sterically hindered amine compounds (component (C)) are those having a molecular weight of more than 1,000 g/mol, preferably from more than 1,000 up to 100,000 g/mol, e.g. up to 50,000 g/mol or up to 20,000 g/mol. A molecular weight of 1,500 to 15,000 g/mol or 1,500 to 5,000 g/mol is especially preferred. A preferred molecular weight of component (B) is also from more than 800 up to 100,000 g/mol, e.g. up to 50,000 g/mol or up to 20,000 g/mol. A molecular weight of more than 800 up to 15,000 g/mol or more than 800 up to 5,000 g/mol is also preferred.

The compounds of the formulae (A-2-a) and (A-2-b) can also be applied as a mixture wherein these two compounds may be present in a weight ratio of 1:20 to 20:1, preferably 1:10 to 10:1.

Component (B) is preferably a compound of the formula (B-1)

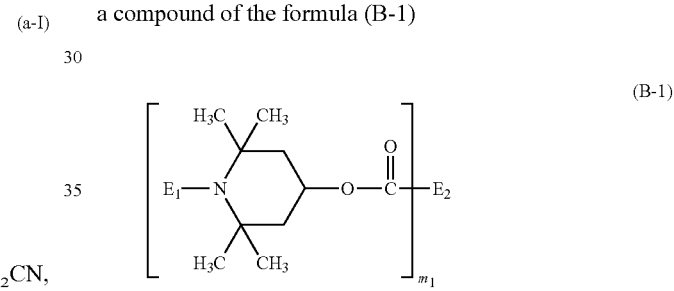

in which $E_1$ is hydrogen, $C_1$-$C_8$alkyl, O, —OH, —$CH_2CN$, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, $m_1$ is 1, 2 or 4, if $m_1$ is 1, $E_2$ is $C_1$-$C_{25}$alkyl, if $m_1$ is 2, $E_2$ is $C_1$-$C_{14}$alkylene or a group of the formula (b-I)

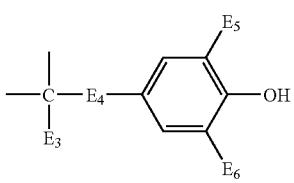

wherein $E_3$ is $C_1$-$C_{10}$alkyl or $C_2$-$C_{10}$alkenyl, $E_4$ is $C_1$-$C_{10}$alkylene, and $E_5$ and $E_6$ independently of one another are $C_1$-$C_4$alkyl, cyclohexyl or methylcyclohexyl, and if $m_1$ is 4, $E_2$ is $C_4$-$C_{10}$alkanetetrayl;

a compound of the formula (B-2)

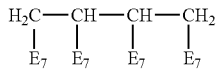
(B-2)

in which two of the radicals $E_7$ are —COO—($C_1$-$C_{20}$alkyl), and two of the radicals $E_7$ are a group of the formula (b-II)

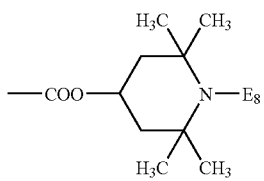
(b-II)

with $E_8$ having one of the meanings of $E_1$;

a compound of the formula (B-3)

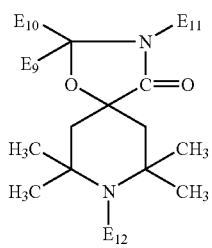
(B-3)

in which $E_9$ and $E_{10}$ together form $C_2$-$C_{14}$alkylene, $E_{11}$ is hydrogen or a group -$Z_1$-COO-$Z_2$, $Z_1$ is $C_2$-$C_{14}$alkylene, and $Z_2$ is $C_1$-$C_{24}$alkyl, and $E_{12}$ has one of the meanings of $E_1$;

a compound of the formula (B-4)

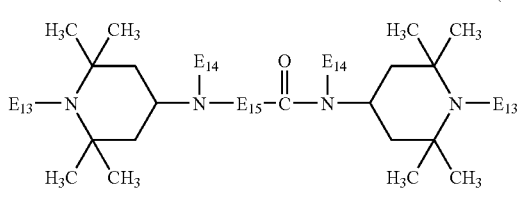
(B-4)

wherein the radicals $E_{13}$ independently of one another have one of the meanings of $E_1$, the radicals $E_{14}$ independently of one another are hydrogen or $C_1$-$C_{12}$alkyl, and $E_{15}$ is $C_1$-$C_{10}$alkylene or $C_3$-$C_{10}$alkylidene;

a compound of the formula (B-5)

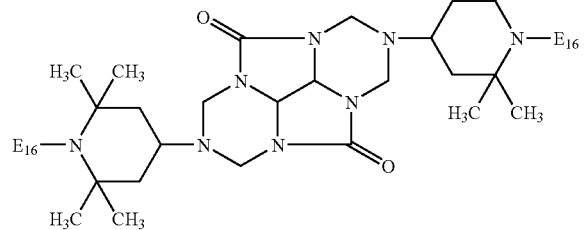
(B-5)

wherein the radicals $E_{16}$ independently of one another have one of the meanings of $E_1$;

a compound of the formula (B-6)

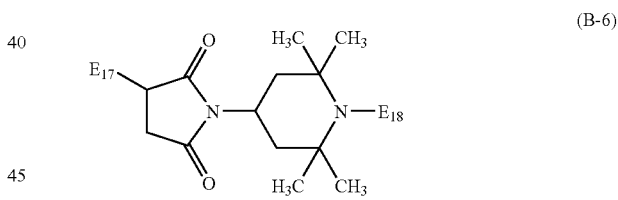
(B-6)

in which $E_{17}$ is $C_1$-$C_{24}$alkyl, and $E_{18}$ has one of the meanings of $E_1$;

a compound of the formula (B-7)

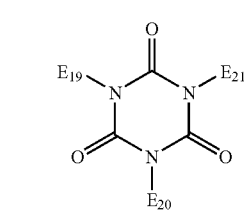
(B-7)

in which $E_{18}$, $E_{20}$ and $E_{21}$ independently of one another are a group of the formula (b-III)

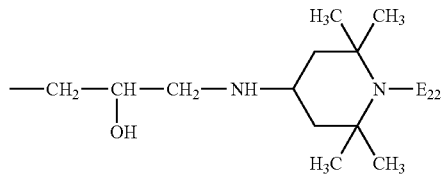
(b-III)

wherein $E_{22}$ has one of the meanings of $E_1$;

a compound of the formula (B-8)

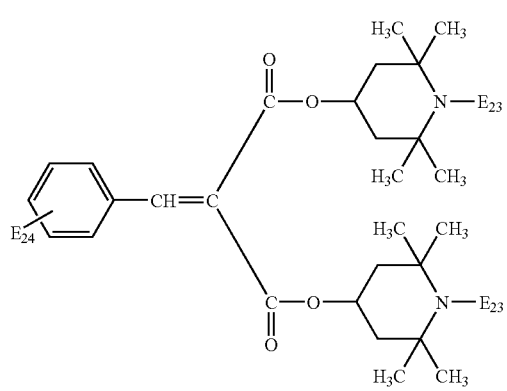
(B-8)

wherein the radicals $E_{23}$ independently of one another have one of the meanings of $E_1$, and $E_{24}$ is hydrogen, $C_1$-$C_{12}$alkyl or $C_1$-$C_{12}$alkoxy;

a compound of the formula (B-9)

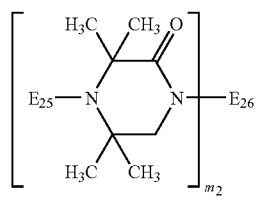
(B-9)

wherein $m_2$ is 1, 2 or 3, $E_{25}$ has one of the meanings of $E_1$, and when $m_2$ is 1, $E_{26}$ is a group

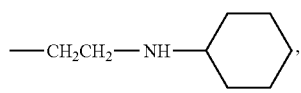

when $m_2$ is 2, $E_{26}$ is $C_2$-$C_{22}$alkylene, and when $m_2$ is 3, $E_{26}$ is a group of the formula (b-IV)

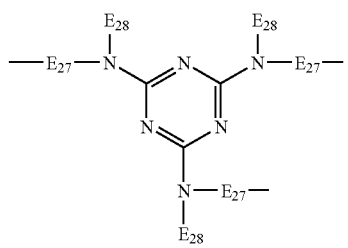
(b-IV)

wherein the radicals $E_{27}$ independently of one another are $C_2$-$C_{12}$alkylene, and the radicals $E_{28}$ independently of one another are $C_1$-$C_{12}$alkyl or $C_5$-$C_{12}$cycloalkyl; or a compound of the formula (B-10)

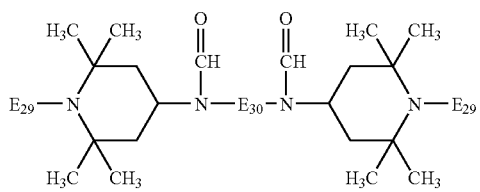
(B-10)

wherein the radicals $E_{29}$ independently of one another have one of the meanings of $E_1$, and $E_{30}$ is $C_2$-$C_{22}$alkylene, $C_5$-$C_7$cycloalkylene, $C_1$-$C_4$alkylenedi($C_5$-$C_7$cycloalkylene), phenylene or phenylenedi($C_1$-$C_4$alkylene).

Component (C) is preferably a compound of the formula (C-1)

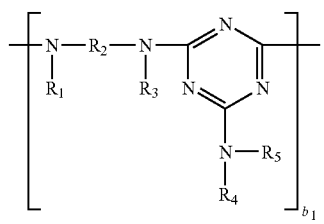
(C-1)

in which $R_1$, $R_3$, $R_4$ and $R_5$ independently of one another are hydrogen, $C_1$-$C_{12}$alkyl, $C_5$-$C_{12}$cycloalkyl, $C_1$-$C_4$-alkyl-substituted $C_5$-$C_{12}$cycloalkyl, phenyl, phenyl which is substituted by —OH and/or $C_1$-$C_{10}$alkyl; $C_7$-$C_9$phenylalkyl, $C_7$-$C_9$phenylalkyl which is substituted on the phenyl radical by —OH and/or $C_1$-$C_{10}$alkyl; or a group of the formula (c-I)

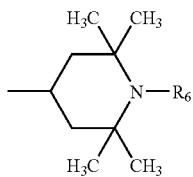
(c-I)

$R_2$ is $C_2$-$C_{18}$alkylene, $C_5$-$C_7$cycloalkylene or $C_1$-$C_4$alkylenedi($C_5$-$C_7$cycloalkylene), or the radicals $R_1$, $R_2$ and $R_3$, together with the nitrogen atoms to which they are bonded, perform a 5- to 10-membered heterocyclic ring, or $R_4$ and $R_5$, together with the nitrogen atom to which they are bonded, form a 5- to 10-membered heterocyclic ring, $R_6$ is hydrogen, $C_1$-$C_8$alkyl, O, —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, and $b_1$ is a number from 2 to 50, with the proviso that at least one of the radicals $R_1$, $R_3$, $R_4$ and $R_5$ is a group of the formula (c-I);

a compound of the formula (C-2)

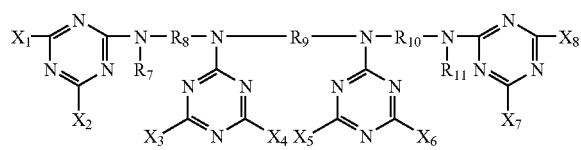
(C-2)

wherein $R_7$ and $R_{11}$ independently of one another are hydrogen or $C_1$-$C_{12}$alkyl, $R_8$, $R_9$ and $R_{10}$ independently of one another are $C_2$-$C_{10}$alkylene, and $X_1$, $X_2$, $X_3$, $X_4$, $X_5$, $X_6$, $X_7$ and $X_8$ independently of one another are a group of the formula (C-II),

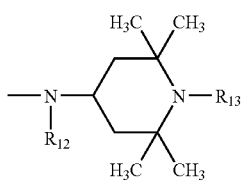
(c-II)

in which $R_{12}$ is hydrogen, $C_1$-$C_{12}$alkyl, $C_5$-$C_{12}$cycloalkyl, $C_1$-$C_4$alkyl-substituted $C_5$-$C_{12}$cycloalkyl, phenyl, —OH— and/or $C_1$-$C_{10}$alkyl-substituted phenyl, $C_7$-$C_9$phenylalkyl, $C_7$-$C_9$phenylalkyl which is substituted on the phenyl radical by —OH and/or $C_1$-$C_{10}$alkyl; or a group of the formula (c-I) as defined above, and $R_{13}$ has one of the meanings of $R_6$;

a compound of the formula (C-3)

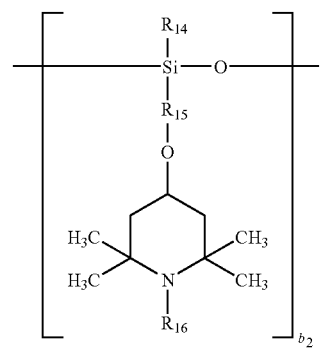
(C-3)

in which $R_{14}$ is $C_1$-$C_{10}$alkyl, $C_5$-$C_{12}$cycloalkyl, $C_1$-$C_4$alkyl-substituted $C_5$-$C_{12}$cycloalkyl, phenyl or $C_1$-$C_{10}$alkyl-substituted phenyl, $R_{15}$ is $C_3$-$C_{10}$alkylene, $R_{16}$ has one of the meanings of $R_6$, and $b_2$ is a number from 2 to 50;

a compound of the formula (C-4)

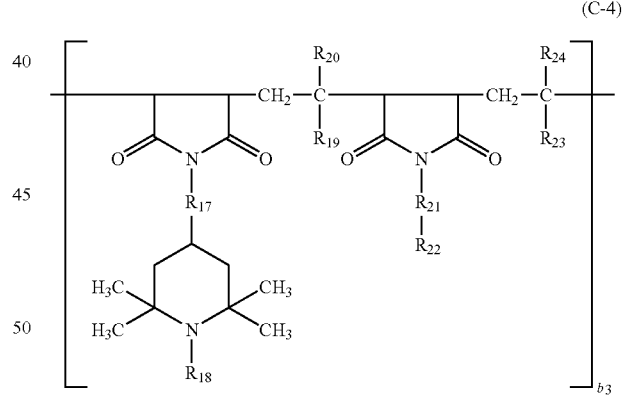
(C-4)

in which $R_{17}$ and $R_{21}$ independently of one another are a direct bond or a —N($X_9$)—CO—$X_{10}$—CO—N($X_{11}$)— group, where $X_9$ and $X_{11}$ independently of one another are hydrogen, $C_1$-$C_8$alkyl, $C_5$-$C_{12}$cycloalkyl, phenyl, $C_7$-$C_9$phenylalkyl or a group of the formula (c-I), $X_{10}$ is a direct bond or $C_1$-$C_4$alkylene, $R_{18}$ has one of the meanings of $R_6$, $R_{19}$, $R_{20}$, $R_{23}$ and $R_{24}$ independently of one another are hydrogen, $C_1$-$C_{30}$alkyl, $C_5$-$C_{12}$cycloalkyl or phenyl, $R_{22}$ is hydrogen, $C_1$-$C_{30}$alkyl, $C_5$-$C_{12}$cycloalkyl, phenyl, $C_7$-$C_9$phenylalkyl or a group of the formula (c-I), and $b_3$ is a number from 1 to 50;

a compound of the formula (C-5)

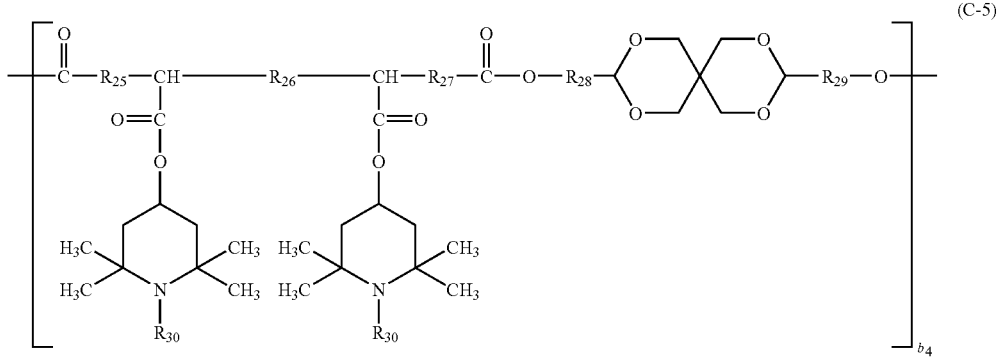

in which $R_{25}$, $R_{26}$, $R_{27}$, $R_{28}$ and $R_{29}$ independently of one another are a direct bond or $C_1$-$C_{10}$alkylene, $R_{30}$ has one of the meanings of $R_6$, and $b_4$ is a number from 1 to 50; or a product (C-6) obtainable by reacting a product, obtained by reaction of a polyamine of the formula (C-6-1) with cyanuric chloride, with a compound of the formula (C-6-2)

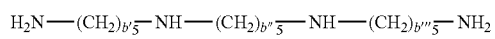

(C-6-1)

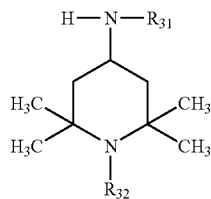

(C-6-2)

in which $b'_5$, $b''_5$ and $b'''_5$ independently of one another are a number from 2 to 12, $R_{31}$ is hydrogen, $C_1$-$C_{12}$alkyl, $C_5$-$C_{12}$cycloalkyl, phenyl or $C_7$-$C_9$phenylalkyl, and $R_{32}$ has one of the meanings of Rr.

Examples of alkyl having up to 30 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethyl-butyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl and triacontyl. One of the preferred definitions of $A_8$, $E_1$, $E_8$, $E_{12}$, $E_{13}$, $E_{16}$, $E_{18}$, $E_{22}$, $E_{23}$, $E_{25}$, $E_{29}$, $R_6$, $R_{13}$, $R_{16}$, $R_{18}$, $R_{30}$ and $R_{32}$ is $C_1$-$C_4$alkyl, especially methyl. $R_{31}$ is preferably butyl.

Examples of alkoxy having up to 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. One of the preferred meanings of $E_1$ is octoxy. $E_{24}$ is preferably $C_1$-$C_4$alkoxy and one of the preferred meanings of $R_6$ is propoxy.

Examples of $C_5$-$C_{12}$cycloalkyl are cyclopentyl, cyclohexyl, cycloheptyl, cyclooctyl and cyclododecyl. $C_5$-$C_8$Cycloalkyl, especially cyclohexyl, is preferred.

$C_1$-$C_4$Alkyl-substituted $C_5$-$C_{12}$cycloalkyl is for example methylcyclohexyl or dimethylcyclohexyl.

Examples of $C_5$-$C_{12}$cycloalkoxy are cyclopentoxy, cyclohexoxy, cycloheptoxy, cyclooctoxy, cyclodecyloxy and cyclododecyloxy. $C_5$-$C_8$Cycloalkoxy, in particular cyclopentoxy and cyclohexoxy, is preferred.

—OH— and/or $C_1$-$C_{10}$alkyl-substituted phenyl is for example methylphenyl, dimethylphenyl, trimethylphenyl, tert-butylphenyl or 3,5-di-tert-butyl-4-hydroxyphenyl.

Examples of $C_7$-$C_9$phenylalkyl are benzyl and phenylethyl.

$C_7$-$C_9$Phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl having up to 10 carbon atoms are allyl, 2-methallyl, butenyl, pentenyl and hexenyl. Allyl is preferred. The carbon atom in position 1 is preferably saturated.

Examples of acyl containing not more than 8 carbon atoms are formyl, acetyl, propionyl, butyryl, pentanoyl, hexanoyl, heptanoyl, octanoyl, acryloyl, methacryloyl and benzoyl. $C_1$-$C_8$Alkanoyl, $C_3$-$C_8$alkenyl and benzoyl are preferred. Acetyl and acryloyl are especially preferred.

Examples of alkylene having up to 22 carbon atoms are methylene, ethylene, propylene, trimethylene, tetramethylene, pentamethylene, 2,2-dimethyltrimethylene, hexamethylene, trimethylhexamethylene, octamethylene and decamethylene.

An example of $C_3$-$C_{10}$alkylidene is the group

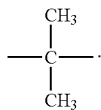

An example of $C_4$-$C_{10}$alkanetetrayl is 1,2,3,4-butanetetrayl.

An example of $C_5$-$C_7$cycloalkylene is cyclohexylene.

An example of $C_1$-$C_4$alkylenedi($C_5$-$C_7$cycloalkylene) is methylenedicyclohexylene.

An example of phenylenedi($C_1$-$C_4$alkylene) is methylene-phenylene-methylene or ethylene-phenylene-ethylene.

Where the radicals $R_1$, $R_2$ and $R_3$, together with the nitrogen atoms to which they are attached, form a 5- to 10-membered heterocyclic ring, this ring is for example

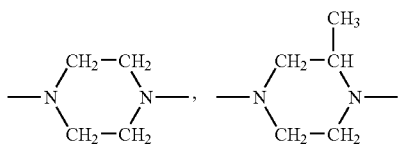

A 6-membered heterocyclic ring is preferred.

Where the radicals $R_4$ and $R_5$, together with the nitrogen atom to which they are attached, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

One of the preferred definitions of $R_{19}$ and $R_{23}$ is phenyl.

$R_{26}$ is preferably a direct bond.

$n_1$, $n_2$, $n_2^*$ and $n_4$ are preferably a number from 2 to 25, in particular 2 to 20 $n_3$ is preferably a number from 1 to 25, in particular 1 to 20.

$b_1$ and $b_2$ are preferably a number from 2 to 25, in particular 2 to 20.

$b_3$ and $b_4$ are preferably a number from 1 to 25, in particluar 1 to 20.

$b'_5$ and $b'''_5$ are preferably 3 and $b''_5$ is preferably 2.

The compounds described above as components (A), (B) and (C) are essentially known and commercially available. All of them can be prepared by known processes.

The preparation of the compounds of component (A) is disclosed for example in U.S. Pat. No. 4,233,412, U.S. Pat. No. 4,340,534, WO-A-98/51,690 and EP-A-1,803.

The preparation of the compounds of component (B) is disclosed for example in U.S. Pat. No. 5,679,733, U.S. Pat. No. 3,640,928, U.S. Pat. No. 4,198,334, U.S. Pat. No. 5,204,473, U.S. Pat. No. 4,619,958, U.S. Pat. No. 4,110,306, U.S. Pat. No. 4,110,334, U.S. Pat. No. 4,689,416, U.S. Pat. No. 4,408,051, SU-A-768,175 (Derwent 88-138,751/20), U.S. Pat. No. 5,049,604, U.S. Pat. No. 4,769,457, U.S. Pat. No. 4,356,307, U.S. Pat. No. 4,619,956, U.S. Pat. No. 5,182,390, GB-A-2,269,819, U.S. Pat. No. 4,292,240, U.S. Pat. No. 5,026,849, U.S. Pat. No. 5,071,981, U.S. Pat. No. 4,547,538 and U.S. Pat. No. 4,976,889.

The preparation of the compounds of component (C) is disclosed for example in U.S. Pat. No. 4,086,204, U.S. Pat. No. 6,046,304, U.S. Pat. No. 4,331,586, U.S. Pat. No. 4,108,829, U.S. Pat. No. 5,051,458, WO-A-94/12,544 (Derwent 94-177,274/22), DD-A-262,439 (Derwent 89-122,983/17), U.S. Pat. No. 4,857,595, U.S. Pat. No. 4,529,760 and U.S. Pat. No. 4,477,615 and CAS 136,504-96-6.

The product (C-6) can be prepared analogously to known processes, for example by reacting a polyamine of formula (C-6-1) with cyanuric chloride in a molar ratio of from 1:2 to 1:4 in the presence of anhydrous lithium carbonate, sodium carbonate or potassium carbonate in an organic solvent such as 1,2-dichloroethane, toluene, xylene, benzene, dioxane or tert-amyl alcohol at a temperature of from −20° C. to +10° C., preferably from −10° C. to +10° C., in particular from 0° C. to +10° C., for from 2 to 8 hours, followed by reaction of the resultant product with a 2,2,6,6-tetramethyl-4-piperidylamine of the formula (C-6-2). The molar ratio of the 2,2,6,6-tetramethyl-4-piperidylamine to polyamine of the formula (C-6-1) employed is for example from 4:1 to 8:1. The quantity of the 2,2,6,6-tetramethyl-4-piperidylamine can be added in one portion or in more than one portion at intervals of a few hours.

The molar ratio of polyamine of the formula (C-6-1) to cyanuric chloride to 2,2,6,6-tetramethyl-4-piperidylamine of the formula (C-6-2) is preferably from 1:3:5 to 1:3:6.

The following example indicates one way of preparing a preferred product (C-6-a).

EXAMPLE 23.6 g (0.128 mol) of cyanuric chloride, 7.43 g (0.0426 mol) of N,N'-bis[3-aminopropyl]ethylenediamine and 18 g (0.13 mol) of anhydrous potassium carbonate are reacted at 5° C. for 3 hours with stirring in 250 ml of 1,2-dichloroethane. The mixture is warmed at room temperature for a further 4 hours. 27.2 g (0.128 mol) of N-(2,2,6,6-tetramethyl-4-piperidyl)butylamine are added and the resultant mixture is warmed at 60° C. for 2 hours. A further 18 g (0.13 mol) of anhydrous potassium carbonate are added and the mixture is warmed at 60° C. for a further 6 hours. The solvent is removed by distillation under a slight vacuum (200 mbar) and replaced by xylene. 18.2 g (0.085 mol) of N-(2,2,6,6-tetramethyl-4-piperidyl)butylamine and 5.2 g (0.13 mol) of ground sodium hydroxide are added, the mixture is heated at reflux for 2 hours and, for a further 12 hours, the water formed during the reaction is removed by azeotropic distillation. The mixture is filtered. The solution is washed with water and dried over $Na_2SO_4$. The solvent is evaporated and the residue is dried at 120-130° C. in vacuo (0.1 mbar). The desired product is obtained as a colourless resin.

In general, the product (C-6) can for example be represented by a compound of the formula (C-6-α), (C-6-β) or (C-6-γ). It can also be in the form of a mixture of these three compounds.

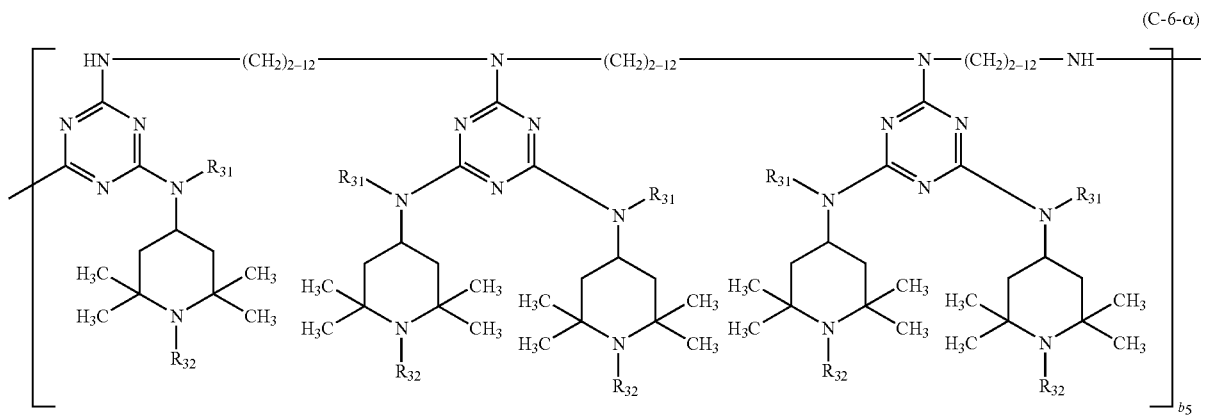
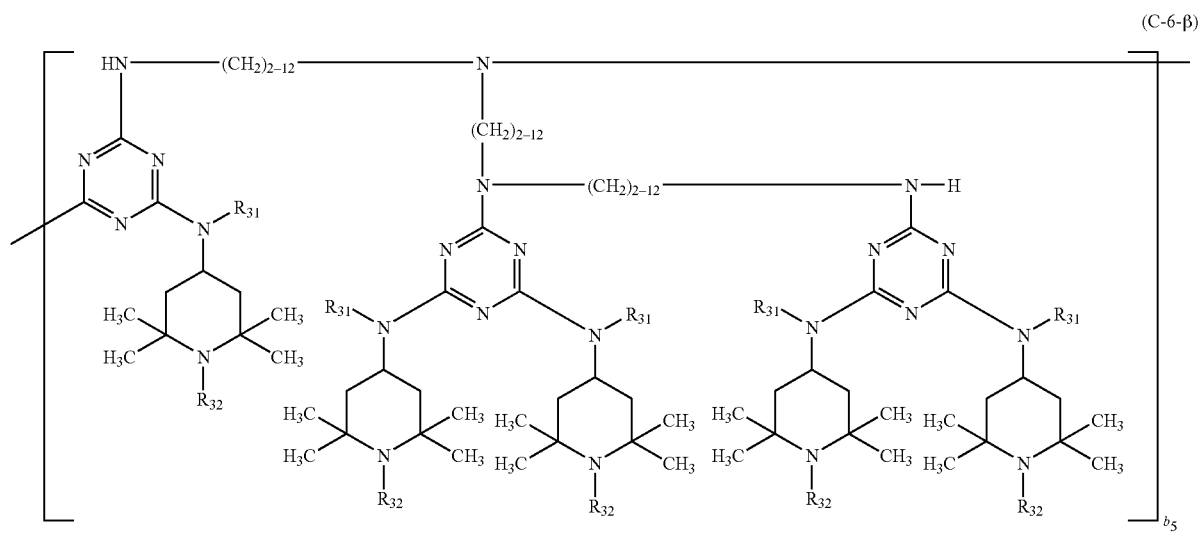
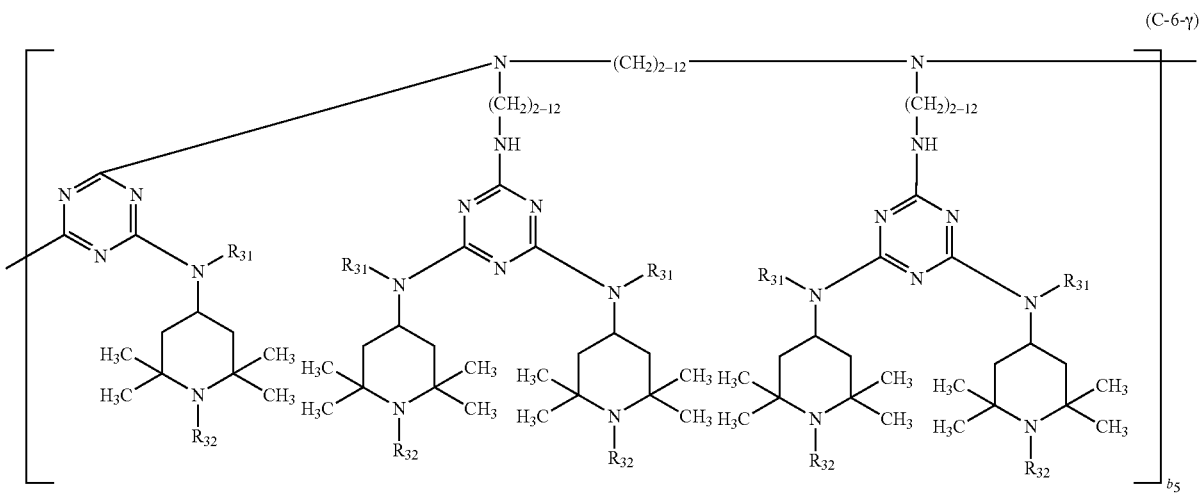

A preferred meaning of the formula (C-6-α) is
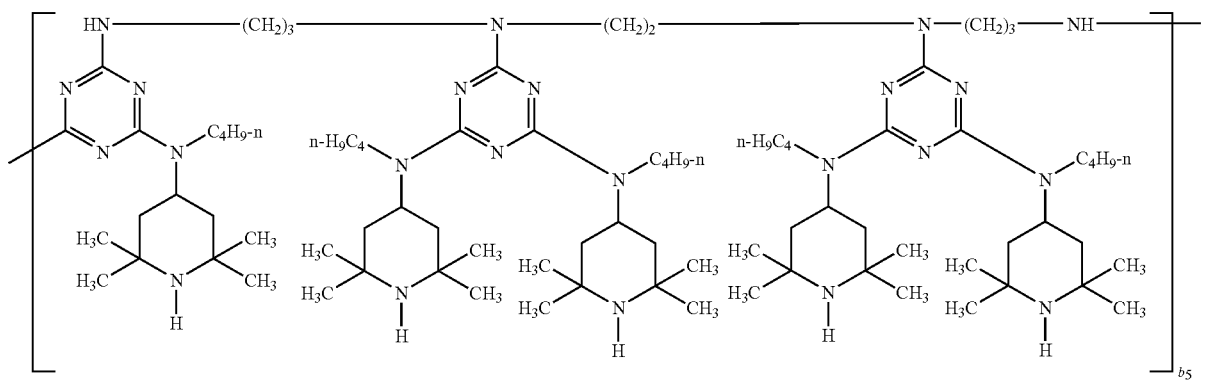
A preferred meaning of the formula (C-6-β) is
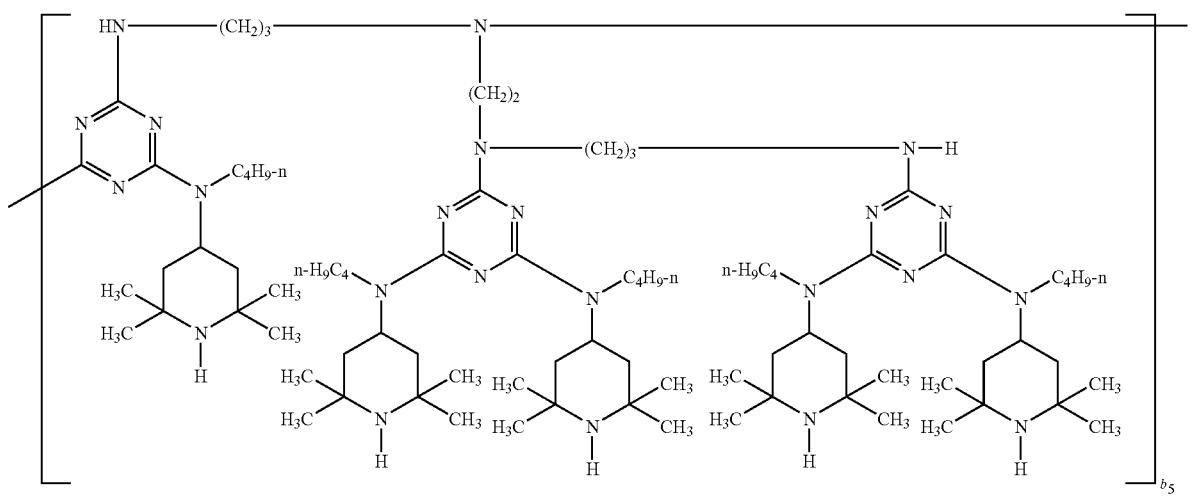
A preferred meaning of the formula (C-6-γ) is
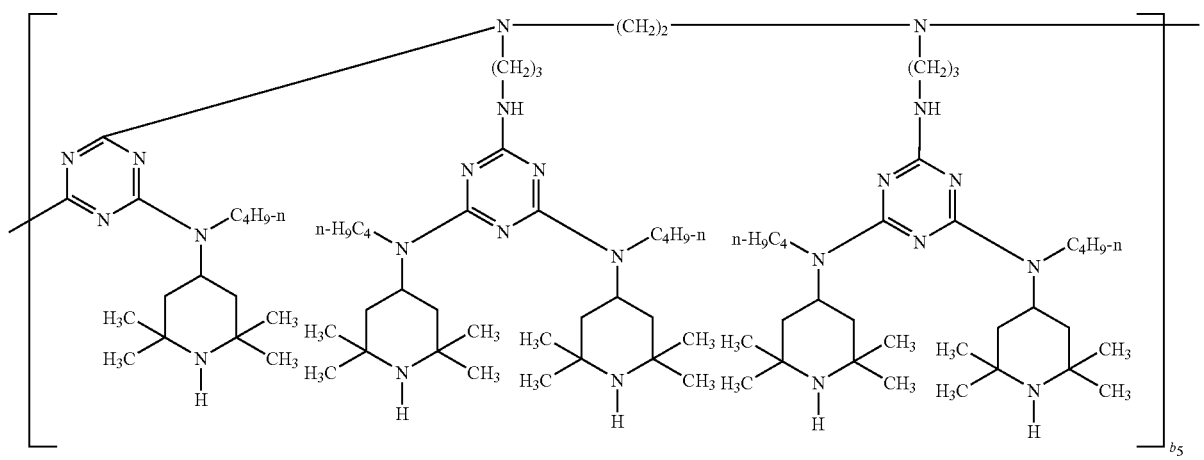

In the above formulae (C-6-α) to (C-6-γ), $b_5$ is preferably 2 to 20, in particular 2 to 10.

Component (A) is preferably TINUVIN 622 (RTM), HOSTAVIN N 30 (RTM) or FERRO AM 806 (RTM).

Component (B) is preferably DASTIB 845 (RTM), TINUVIN 770 (RTM), TINUVIN 765 (RTM), TINUVIN 144 (RTM), TINUVIN 123 (RTM), ADK STAB LA 52 (RTM), ADK STAB LA 57 (RTM), ADK STAB LA 62 (RTM), ADK STAB LA 67 (RTM), HOSTAVIN N 20 (RTM), HOSTAVIN N 24 (RTM), SANDUVOR 3050 (RTM), DIACETAM 5 (RTM), SUMISORB TM 61 (RTM), UVINUL 4049 (RTM), SANDUVOR PR 31 (RTM), GOODRITE UV 3034 (RTM), GOODRITE UV 3150 (RTM), GOODRITE UV 3159 (RTM), GOODRITE 3110×128 (RTM) or UVINUL 4050H (RTM).

Component (C) is preferably CHIMASSORB 944 (RTM), CHIMASSORB 2020 (RTM), CYASORB UV 3346 (RTM), CYASORB UV 3529 (RTM), DASTIB 1082 (RTM), CHIMASSORB 119 (RTM), UVASIL 299 (RTM), UVASIL 125 (RTM), UVASIL 2000 (RTM), UVINUL 5050H (RTM), LICHTSCHUTZSTOFF UV 31 (RTM), LUCHEM HA B 18 (RTM), ADK STAB LA 63 (RTM), ADK STAB LA 68 (RTM) or UVASORB HA 88 (RTM).

The meanings of the terminal groups which saturate the free valences in the compounds of the formulae (A-1), (A-2-a), (A-2-b), (A-4), (C-1), (C-3), (C-4), (C-5), (C-6-a), (C-6-β) and (C-6-γ) depend on the processes used for their preparation. The terminal groups can also be modified after the preparation of the compounds.

If the compounds of the formula (A-1) are prepared, for example, by reacting a compound of the formula

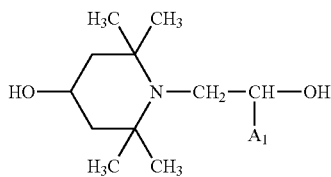

in which $A_1$ is hydrogen or methyl, with a dicarboxylic acid diester of the formula Y—OOC-$A_2$-COO—Y, in which Y is, for example, methyl, ethyl or propyl, and $A_2$ is as defined above, the terminal group bonded to the 2,2,6,6-tetramethyl-4-oxypiperidin-1-yl radical is hydrogen or —CO-$A_2$-COO—Y, and the terminal group bonded to the diacyl radical is —O—Y or

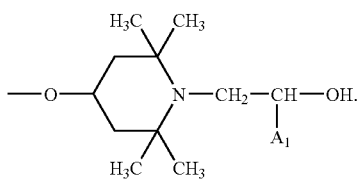

In the compounds of the formula (A-2-a), the terminal group bonded to the nitrogen can be, for example, hydrogen and the terminal group bonded to the 2-hydroxypropylene radical can be, for example, a

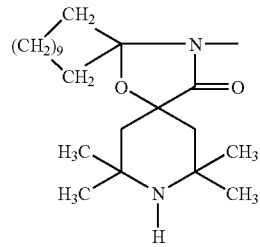

group.

In the compounds of the formula (A-2-b), the terminal group bonded to the dimethylene radical can be, for example, —OH, and the terminal group bonded to the oxygen can be, for example, hydrogen. The terminal groups can also be polyether radicals.

In the compounds of the formula (A-4), the end group bonded to the —$CH_2$— residue can be, for example, hydrogen and the end group bonded to the —$CH(CO_2A_7)$ residue can be, for example, —CH=CH—$COOA_7$.

If the compounds of the formula (C-1) are prepared by reacting a compound of the formula

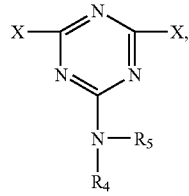

in which X is, for example, halogen, in particular chlorine, and $R_4$ and $R_5$ are as defined above, with a compound of the formula

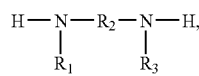

in which $R_1$, $R_2$ and $R_3$ are as defined above, the terminal group bonded to the diamino radical is hydrogen or

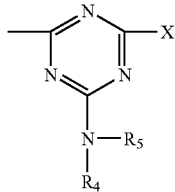

and the terminal group bonded to the triazine radical is X or

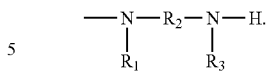

If X is halogen, it is advantageous to replace this, for example, by —OH or an amino group when the reaction is complete. Examples of amino groups which may be mentioned are pyrrolidin-1-yl, morpholino, —NH$_2$, —N(C$_1$-C$_8$)alkyl)$_2$ and —NR(C$_1$-C$_8$alkyl), in which R is hydrogen or a group of the formula (c-I).

The compounds of the formula (C-1) also cover compounds of the formula

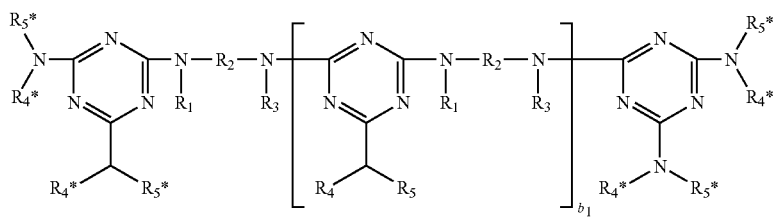

wherein $R_1$, $R_2$, $R_3$, $R_4$, $R_5$ and be are as defined above and $R_4^*$ has one of the meanings of $R_4$ and $R_5^*$ has one of the meanings of $R_5$.

One of the particularly preferred compounds of the formula (C-1) is

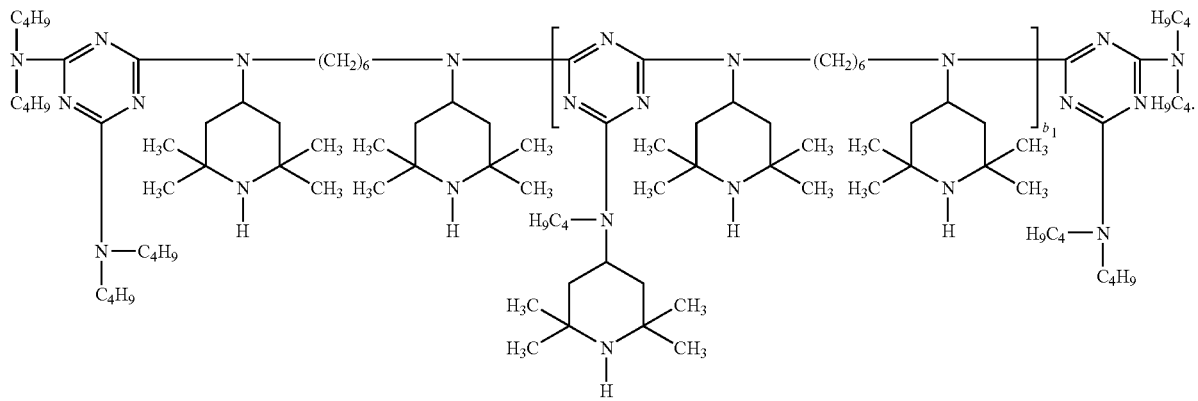

The preparation of this compound is described in Example 10 of U.S. Pat. No. 6,046,304.

In the compounds of the formula (C-3), the terminal group bonded to the silicon atom can be, for example, (R$_{14}$)$_3$Si—O—, and the terminal group bonded to the oxygen can be, for example, —Si(R$_{14}$)$_3$.

The compounds of the formula (C-3) can also be in the form of cyclic compounds if b$_2$ is a number from 3 to 10, i.e. the free valences shown in the structural formula then form a direct bond.

In the compounds of the formula (C-4), the terminal group bonded to the 2,5-dioxopyrrolidine ring is, for example, hydrogen, and the terminal group bonded to the —C(R$_{23}$)(R$_{24}$)— radical is, for example,

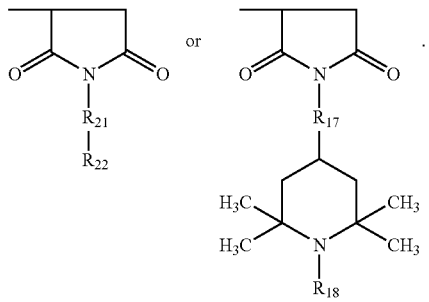

In the compounds of the formula (C-5), the terminal group bonded to the carbonyl radical is, for example,

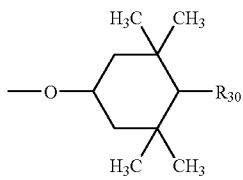

and the terminal group bonded to the oxygen radical is, for example,

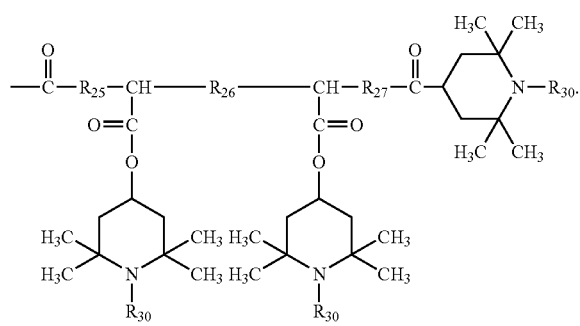

In the compounds of the formulae (C-6-α), (C-6-β) and (C-6-γ), the terminal group bonded to the triazine radical is, for example, Cl or a

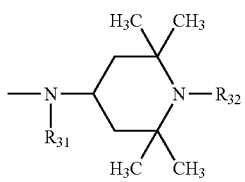

group, and the terminal group bonded to the amino radical is, for example, hydrogen or a

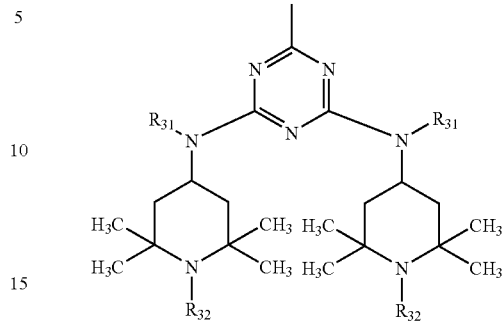

group.

$A_8$ is preferably hydrogen, $C_1$-$C_4$alkyl, $C_1$-$C_{10}$alkoxy, cyclohexyloxy, allyl, benzyl or acetyl.

$E_1$, $E_8$, $E_{12}$, $E_{13}$, $E_{16}$, $E_{18}$, $E_{22}$, $E_{23}$, $E_{25}$ and $E_{29}$ are preferably hydrogen, $C_1$-$C_4$alkyl, $C_1$-$C_{10}$alkoxy, cyclohexyloxy, allyl, benzyl or acetyl.

$R_6$, $R_{13}$, $R_{16}$, $R_{18}$, $R_{30}$ and $R_{32}$ are preferably hydrogen, $C_1$-$C_4$alkyl, $C_1$-$C_{10}$alkoxy, cyclohexyloxy, allyl, benzyl or acetyl.

$A_8$, $E_1$, $E_8$, $E_{12}$, $E_{13}$, $E_{16}$, $E_{18}$, $E_{22}$, $E_{23}$, $E_{25}$, $E_{29}$, $R_6$, $R_{13}$, $R_{16}$, $R_{18}$, $R_{30}$ and $R_{32}$ are in particular hydrogen or methyl and $E_1$ and $R_6$ additionally are $C_1$-$C_8$alkoxy.

According to a preferred embodiment, $A_1$ is hydrogen or methyl, $A_2$ is a direct bond or $C_2$-$C_6$alkylene, and $n_1$ is a number from 2 to 25;

$n_2$ and $n_2^*$ are a number from 2 to 25;

$A_3$ and $A_4$ independently of one another are hydrogen or $C_1$-$C_4$alkyl, or $A_3$ and $A_4$ together form a $C_9$-$C_{13}$alkylene group, and the variables $n_3$ independently of one another are a number from 1 to 25;

$n_4$ is a number from 2 to 25, $A_5$ and $A_6$ independently of one another are $C_1$-$C_4$alkyl, and $A_7$ is $C_1$-$C_4$alkyl or a group of the formula (a-I)

with the proviso that at least 50% of the radicals $A_7$ are a group of the formula (a-I).

According to a further preferred embodiment $m_1$ is 1, 2 or 4, if $m_1$ is 1, $E_2$ is $C_{12}$-$C_{20}$alkyl, if $m_1$ is 2, $E_2$ is $C_2$-$C_{10}$alkylene or a group of the formula (b-I)

$E_3$ is $C_1$-$C_4$alkyl, $E_4$ is $C_1$-$C_6$alkylene, and $E_5$ and $E_6$ independently of one another are $C_1$-$C_4$alkyl, and if $m_1$ is 4, $E_2$ is $C_4$-$C_8$alkanetetrayl;

two of the radicals $E_7$ are —COO—($C_{10}$-$C_{15}$alkyl), and two of the radicals $E_7$ are a group of the formula (b-II);

$E_9$ and $E_{10}$ together form $C_9$-$C_{13}$alkylene, $E_{11}$ is hydrogen or a group -$Z_1$-COO-$Z_2$, $Z_1$ is $C_2$-$C_6$alkylene, and $Z_2$ is $C_{10}$-$C_{16}$alkyl;

$E_{14}$ is hydrogen, and $E_{15}$ is $C_2$-$C_6$alkylene or $C_3$-$C_5$alkylidene;

$E_{17}$ is $C_{10}$-$C_{14}$alkyl;

$E_{24}$ is $C_1$-$C_4$alkoxy;

$m_2$ is 1, 2 or 3, when $m_2$ is 1, $E_{26}$ is a group

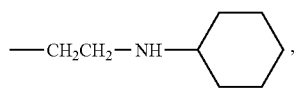

when $m_2$ is 2, $E_{26}$ is $C_2$-$C_6$alkylene, and when $m_2$ is 3, $E_{26}$ is a group of the formula (b-IV)

the radicals $E_{27}$ independently of one another are $C_2$-$C_6$alkylene, and the radicals $E_{28}$ independently of one another are $C_1$-$C_4$alkyl or $C_5$-$C_8$cycloalkyl; and $E_{30}$ is $C_2$-$C_8$alkylene.

According to another preferred embodiment $R_1$ and $R_3$ independently of one another are a group of the formula (c-I), $R_2$ is $C_2$-$C_8$alkylene, $R_4$ and $R_5$ independently of one another are hydrogen, $C_1$-$C_{12}$alkyl, $C_5$-$C_8$cycloalkyl or a group of the formula (c-I), or the radicals $R_4$ and $R_5$, together with the nitrogen atom to which they are bonded, form a 5- to 10-membered heterocyclic ring, and $b_1$ is a number from 2 to 25;

$R_7$ and $R_{11}$ independently of one another are hydrogen or $C_1$-$C_4$alkyl, $R_8$, $R_9$ and $R_{10}$ independently of one another are $C_2$-$C_4$alkylene, and $X_1$, $X_2$, $X_3$, $X_4$, $X_5$, $X_6$, $X_7$ and $X_8$ independently of one another are a group of the formula (c-II), $R_{12}$ is hydrogen, $C_1$-$C_4$alkyl, $C_5$-$C_8$cycloalkyl or a group of the formula (c-I);

$R_{14}$ is $C_1$-$C_4$alkyl, $R_{15}$ is $C_3$-$C_6$alkylene, and $b_2$ is a number from 2 to 25;

$R_{17}$ and $R_{21}$ independently of one another are a direct bond or a group —N($X_9$)—CO—$X_{10}$—CO—N($X_{11}$)—, $X_9$ and $X_{11}$ independently of one another are hydrogen or $C_1$-$C_4$alkyl, $X_{10}$ is a direct bond, $R_{19}$ and $R_{23}$ are $C_1$-$C_{25}$alkyl or phenyl, $R_{20}$ and $R_{24}$ are hydrogen or $C_1$-$C_4$alkyl, $R_{22}$ is $C_1$-$C_{25}$alkyl or a group of the formula (c-I), and $b_3$ is a number from 1 to 25;

$R_{25}$, $R_{26}$, $R_{27}$, $R_{28}$ and $R_{29}$ independently of one another are a direct bond or $C_1$-$C_4$alkylene, and $b_4$ is a number from 1 to 25;

$b'_5$, $b''_5$ and $b'''_5$ independently of one another are a number from 2 to 4, and $R_{31}$ is hydrogen, $C_1$-$C_4$alkyl, $C_5$-$C_8$cycloalkyl, phenyl or benzyl.

A particularly preferred embodiment of this invention relates to a stabilizer mixture wherein component (A) is a compound of the formula (A-1-a), (A-2-a), (A-2-b), (A-3-a) or (A-4-a);

(A-1-a)

wherein $n_1$ is a number from 2 to 20;

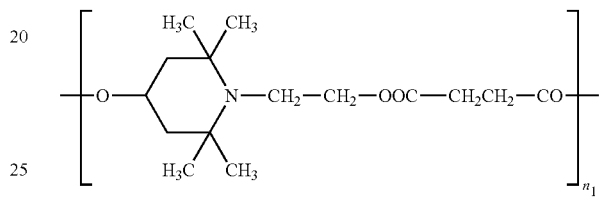
(A-2-a)

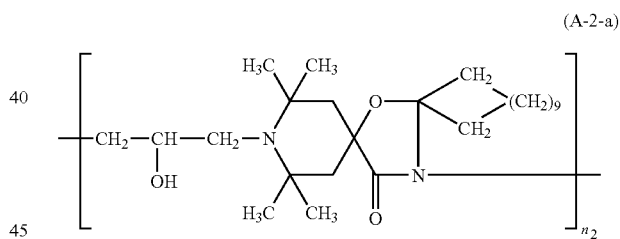
(A-2-b)

wherein $n_2$ and $n_2^*$ are a number from 2 to 20;

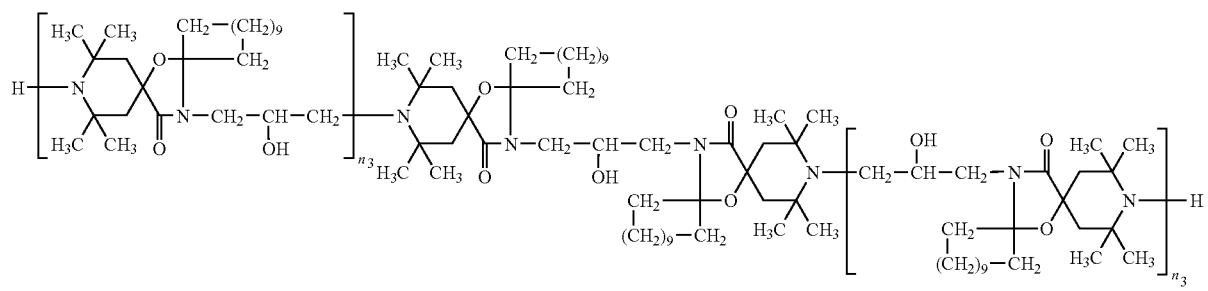

(A-3-a)

wherein the variables $n_3$ independently of one another are a number from 1 to 20;

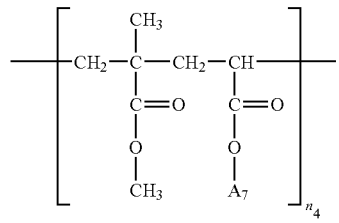

(A-4-a)

wherein $n_4$ is a number from 2 to 20, and at least 50% of the radicals $A_7$ are a group of the formula (a-I)

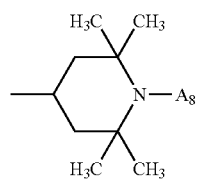

(a-I)

wherein $A_8$ is hydrogen, $C_1$-$C_8$alkyl, $O^-$, —OH, —$CH_2CN$, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, and the remaining radicals $A_7$ are ethyl;

component (B) is a compound of the formula (B-1-a), (B-1-b), (B-1-c), (B-1-d), (B-2-a), (B-3-a), (B-3-b), (B-4-a), (B-4-b), (B-5), (B-6-a), (B-7), (B-8-a), (B-9-a), (B-9-b), (B-9-c) or (B-10-a);

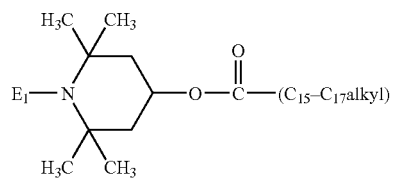

(B-1-a)

-continued

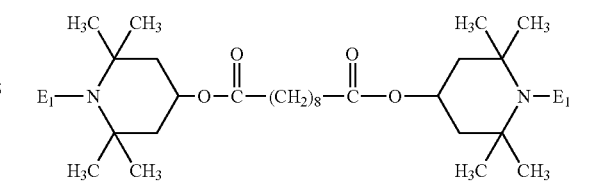

(B-1-b)

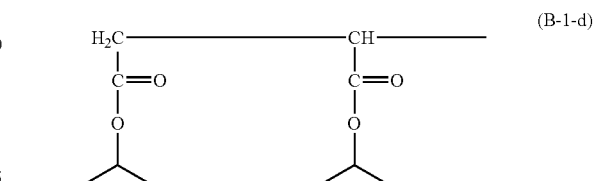

(B-1-c)

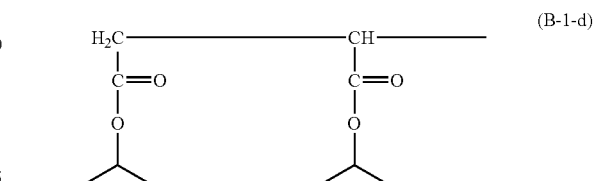

(B-1-d)

wherein $E_1$ is hydrogen, $C_1$-$C_8$alkyl, O, —OH, —$CH_2CN$, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl;

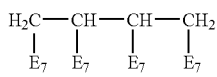
(B-2-a)

in which two of the radicals $E_7$ are —COO—$C_{13}H_{27}$ and two of the radicals $E_7$ are

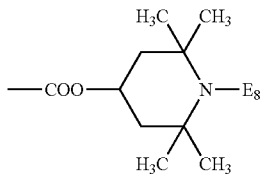

and $E_8$ has one of the meanings of $E_1$;

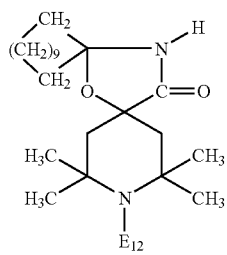
(B-3-a)

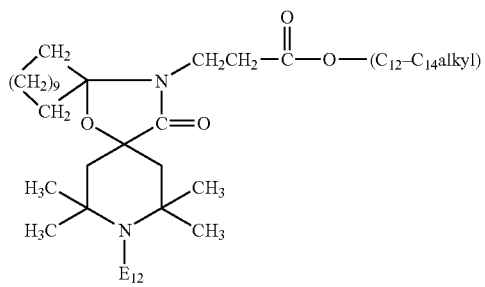
(B-3-b)

wherein $E_{12}$ has one of the meanings of $E_1$;

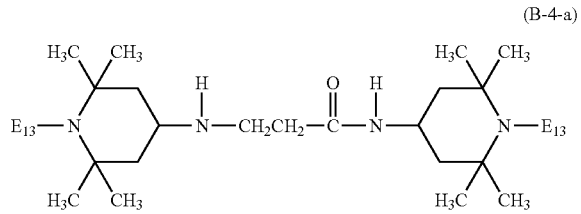
(B-4-a)

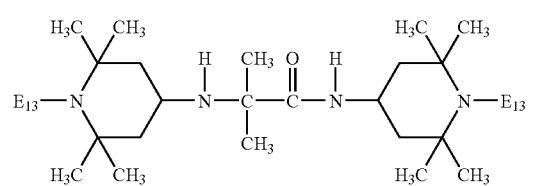
(B-4-b)

wherein $E_{13}$ has one of the meanings of $E_1$;

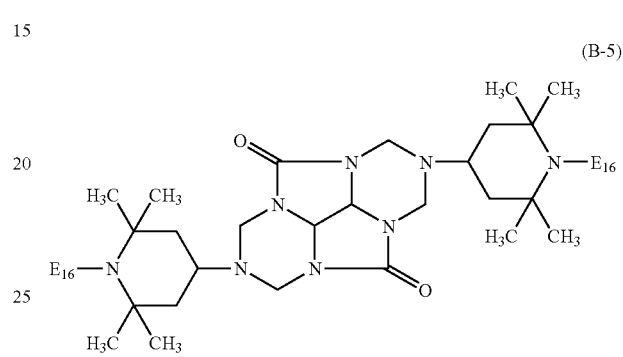
(B-5)

wherein $E_{16}$ has one of the meanings of $E_1$;

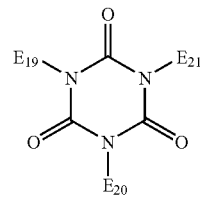
(B-6-a)

wherein $E_{18}$ has one of the meanings of $E_1$;

(B-7)

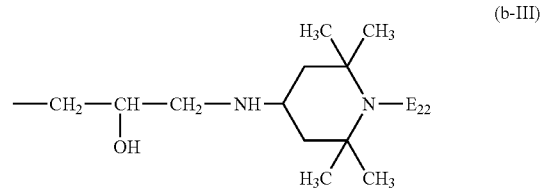

in which $E_{19}$, $E_{20}$ and $E_{21}$ independently of one another are a group of the formula (b-III)

(b-III)

wherein $E_{22}$ has one of the meanings of $E_1$;
wherein $E_{25}$ has one of the meanings of $E_1$;
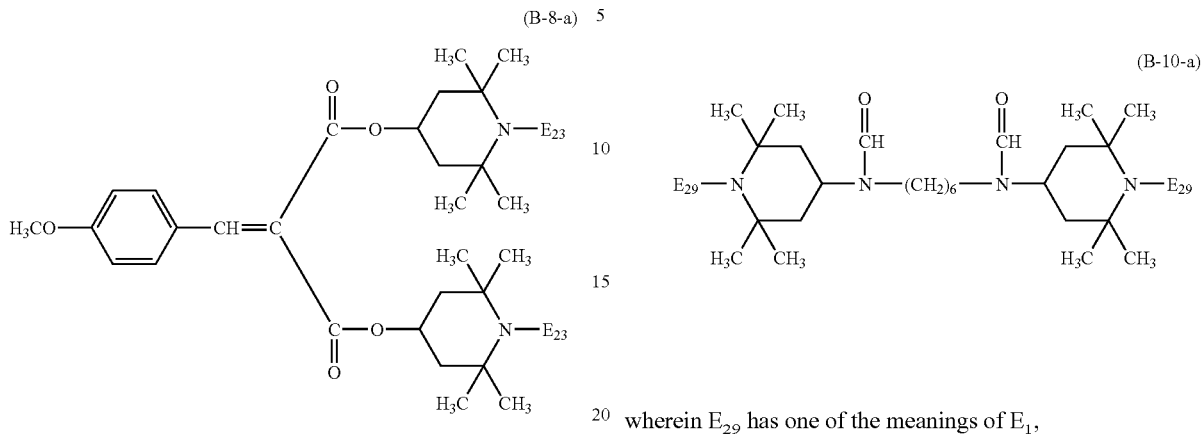
(B-8-a)
wherein $E_{23}$ has one of the meanings of $E_1$;
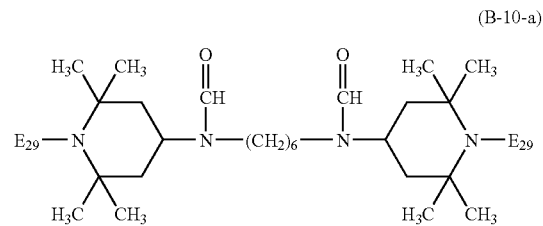
(B-10-a)
wherein $E_{29}$ has one of the meanings of $E_1$,
component (C) is a compound of the formula (C-1-a), (C-1-b), (C-1-c), (C-1-d), (C-2-a), (C-3-a), (C-4-a), (C-4-b), (C-4-c) or (C-5-a) or a product (C-6-a);
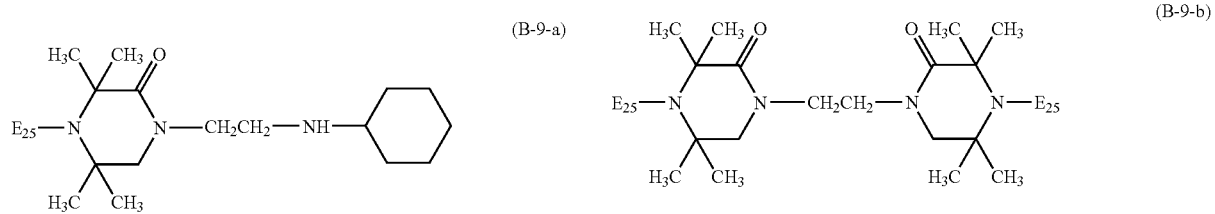
(B-9-a) (B-9-b)
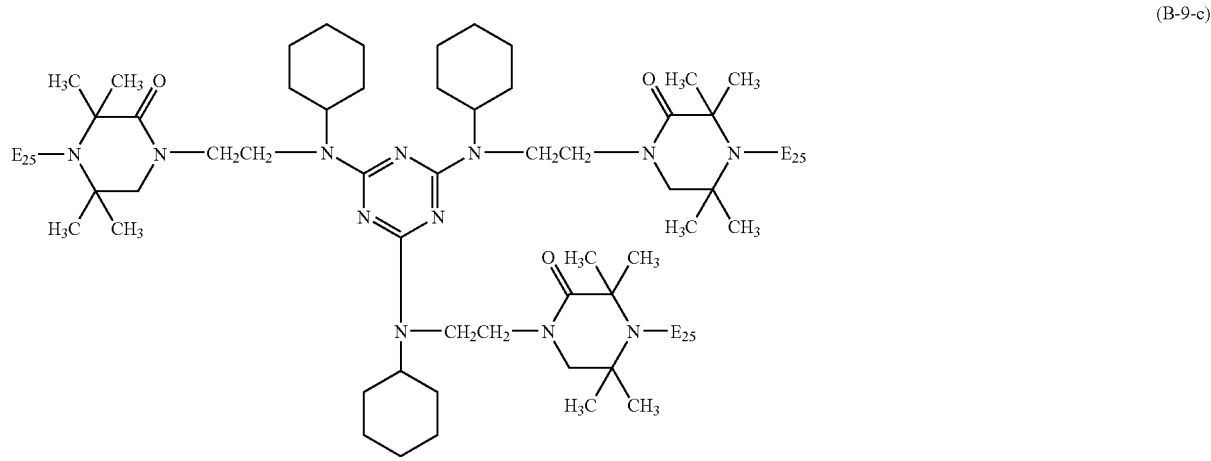
(B-9-c)

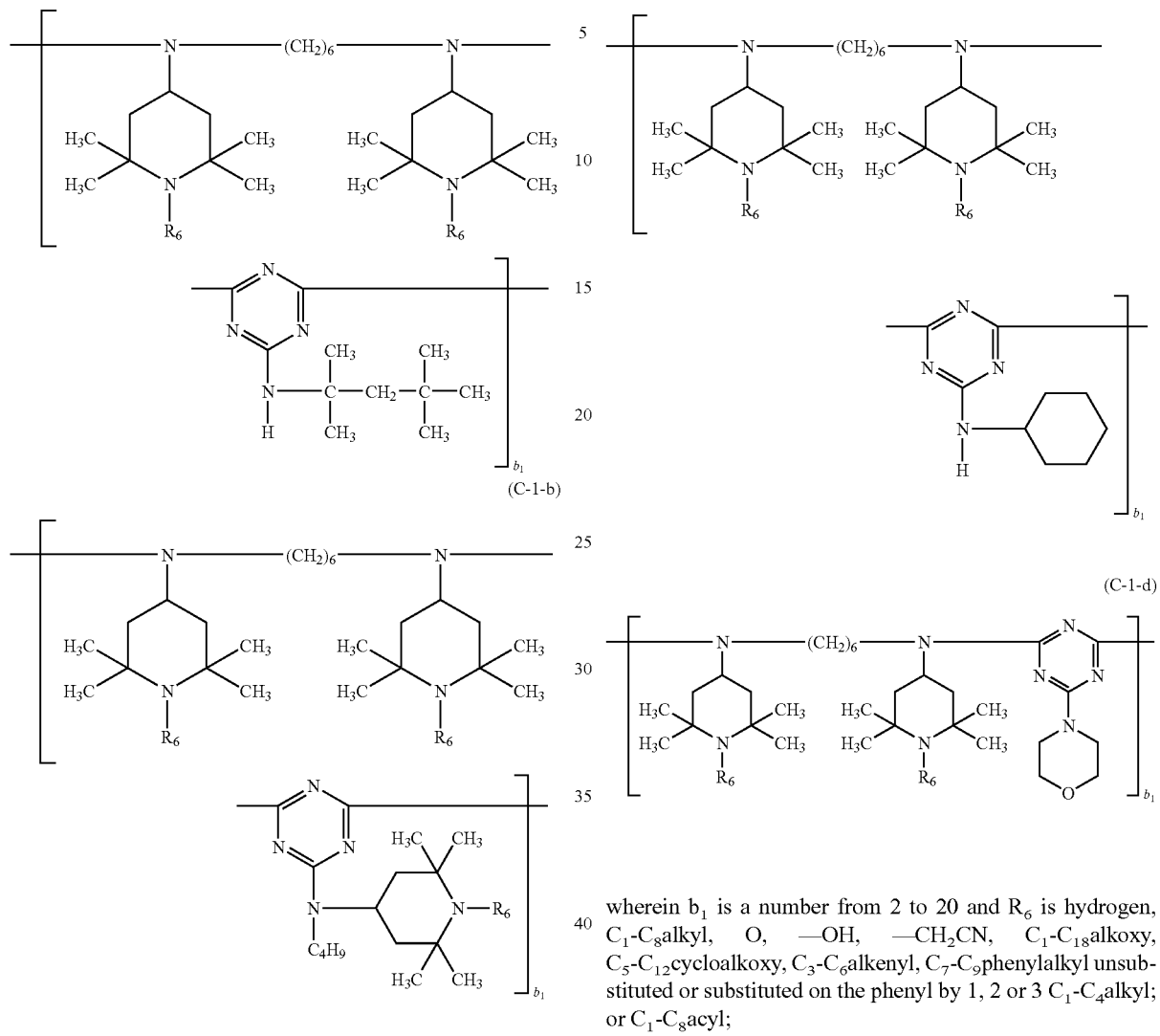
wherein $b_1$ is a number from 2 to 20 and $R_6$ is hydrogen, $C_1$-$C_8$alkyl, O, —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl;
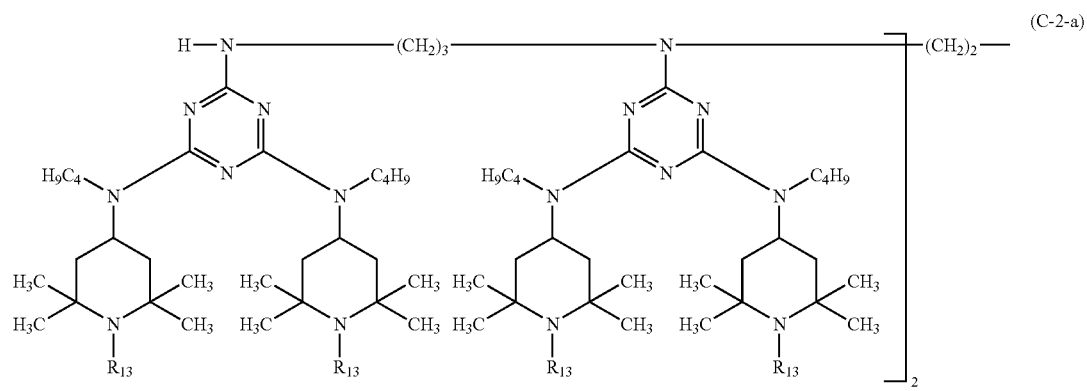

wherein $R_{13}$ has one of the meanings of $R_6$,

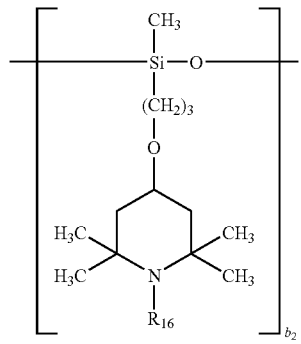
(C-3-a)

wherein $b_2$ is a number from 2 to 20 and $R_{16}$ has one of the meanings of $R_6$;

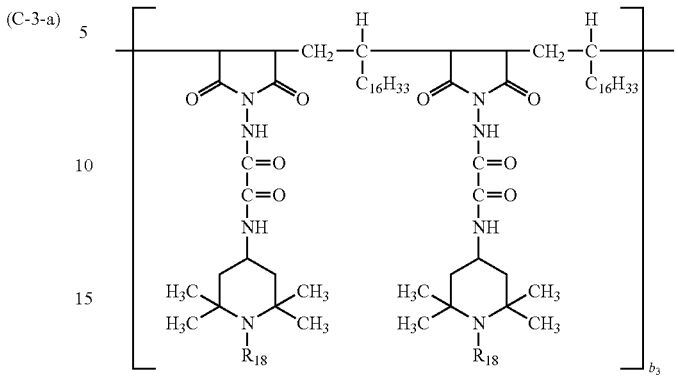
(C-4-c)

wherein $b_3$ is a number from 1 to 20 and $R_{18}$ has one of the meanings of $R_6$;

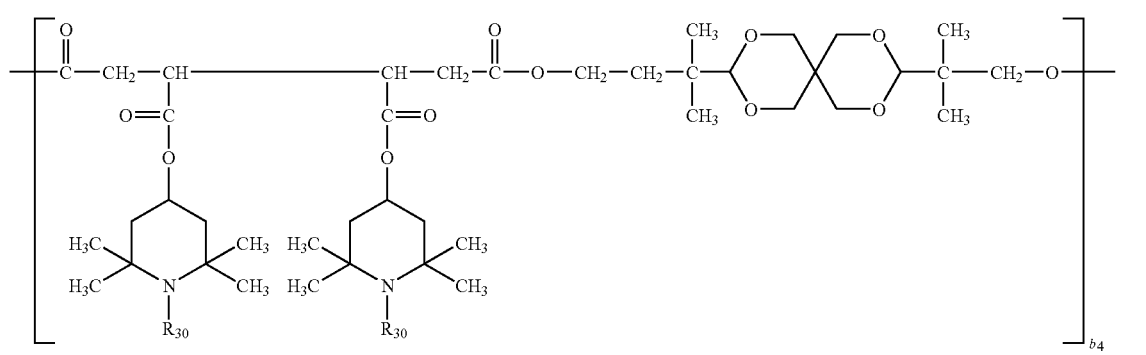
(C-5-a)

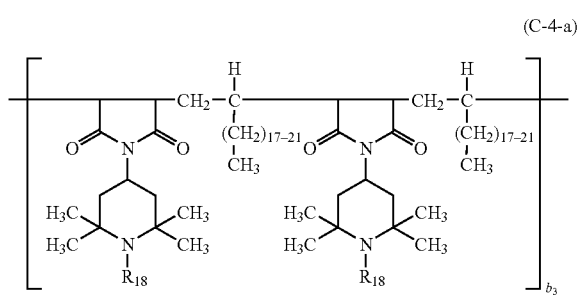
(C-4-a)

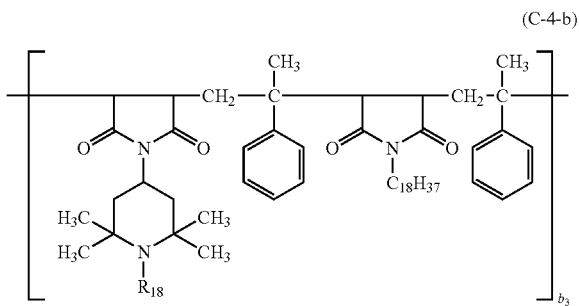
(C-4-b)

wherein $b_4$ is a number from 1 to 20 and $R_{30}$ has one of the meanings of $R_6$;

a product (C-6-a) obtainable by reacting a product, obtained by reaction of a polyamine of the formula (C-6-1-a) with cyanuric chloride, with a compound of the formula (C-6-2-a)

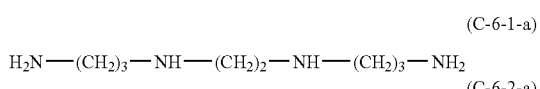
(C-6-1-a)

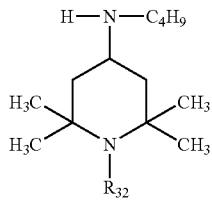
(C-6-2-a)

in which $R_{32}$ has one of the meanings of $R_6$.

A particularly preferred embodiment of this invention also relates to a stabilizer mixture wherein component (A) is a compound of the formula (A-1-a) wherein n, is a number from 2 to 20, or a compound of the formula (A-2-a) or (A-2-b) wherein $n_2$ and $n_2^*$ are a number from 2 to 20, component (B) is a compound of the formula (B-1-b) wherein $E_1$ is hydrogen and component (C) is a compound of the formula (C-1-a) wherein $b_1$ is a number from 2 to 20 and $R_6$ is hydrogen, or a compound of the formula (C-1-b) wherein $R_6$ is hydrogen or propoxy and $b_1$ is a number from 2 to 20, or a compound of the formula (C-1-d) wherein $R_6$ is hydrogen or methyl and b, is a number from 2 to 20, or a compound of the formula (C-2-a) wherein $R_{13}$ is methyl, or a compound of the formula (C-3-a) wherein $R_{16}$ is hydrogen and $b_2$ is a number from 2 to 20, or a compound of the formula (C-4-a) wherein $R_{18}$ is hydrogen and $b_3$ is a number from 1 to 20, or a product (C-6-a).

A further particularly preferred embodiment of this invention relates to a stabilizer mixture wherein component (A) is a compound of the formula (A-1-a) wherein n, is a number from 2 to 20, or a compound of the formula (A-2-a) or (A-2-b) wherein $n_2$ and $n_2^*$ are a number from 2 to 20, component (B) is a compound of the formula (B-1-b) wherein $E_1$ is hydrogen and component (C) is a compound of the formula (C-1-a) wherein $b_1$ is a number from 2 to 20 and $R_6$ is hydrogen.

Examples of stabilizer mixtures according to the present invention are the following combinations of commercial products:

1. TINUVIN 622 (RTM)+CHIMASSORB 944 (RTM)+TINUVIN 770 (RTM)
2. TINUVIN 622 (RTM)+CHIMASSORB 944 (RTM)+TINUVIN 765 (RTM)
3. TINUVIN 622 (RTM)+CHIMASSORB 944 (RTM)+TINUVIN 144 (RTM)
4. TINUVIN 622 (RTM)+CHIMASSORB 944 (RTM)+TINUVIN 123 (RTM)
5. TINUVIN 622 (RTM)+CHIMASSORB 944 (RTM)+compound of the formula (B-3-a) wherein $E_{12}$ is hydrogen
6. TINUVIN 622 (RTM)+CHIMASSORB 944 (RTM)+HOSTAVIN N 24 (RTM)
7. TINUVIN 622 (RTM)+CHIMASSORB 944 (RTM)+DI-ACETAM 5 (RTM)
8. TINUVIN 622 (RTM)+CHIMASSORB 944 (RTM)+ADK STAB LA 52 (RTM)
9. TINUVIN 622 (RTM)+CHIMASSORB 944 (RTM)+ADK STAB LA 57 (RTM)
10. TINUVIN 622 (RTM)+CHIMASSORB 944 (RTM)+ADK STAB LA 62 (RTM)
11. TINUVIN 622 (RTM)+CHIMASSORB 944 (RTM)+ADK STAB LA 67 (RTM)
12. TINUVIN 622 (RTM)+CHIMASSORB 944 (RTM)+GOODRITE UV 3034 (RTM)
13. TINUVIN 622 (RTM)+CHIMASSORB 944 (RTM)+GOODRITE UV 3150 (RTM)
14. TINUVIN 622 (RTM)+CHIMASSORB 944 (RTM)+GOODRITE UV 3159 (RTM)
15. TINUVIN 622 (RTM)+CHIMASSORB 944 (RTM)+compound of the formula (B-9-a) wherein $E_{25}$ is hydrogen
16. TINUVIN 622 (RTM)+CHIMASSORB 944 (RTM)+UVINUL 4049 (RTM)
17. TINUVIN 622 (RTM)+CHIMASSORB 944 (RTM)+compound of the formula (B-10-a) wherein $E_{29}$ is hydrogen
18. TINUVIN 622 (RTM)+CHIMASSORB 944 (RTM)+compound of the formula (B-1-a) wherein $E_1$ is hydrogen
19. TINUVIN 622 (RTM)+CHIMASSORB 944 (RTM)+SUMISORB TM 61 (RTM)
20. TINUVIN 622 (RTM)+CHIMASSORB 944 (RTM)+SANDUVOR 3050 (RTM)
21. TINUVIN 622 (RTM)+CHIMASSORB 944 (RTM)+SANDUVOR PR-31 (RTM)
22. TINUVIN 622 (RTM)+CHIMASSORB 119 (RTM)+TINUVIN 770 (RTM)
23. TINUVIN 622 (RTM)+CHIMASSORB 119 (RTM)+TINUVIN 765 (RTM)
24. TINUVIN 622 (RTM)+CHIMASSORB 119 (RTM)+TINUVIN 144 (RTM)
25. TINUVIN 622 (RTM)+CHIMASSORB 119 (RTM)+TINUVIN 123 (RTM)
26. TINUVIN 622 (RTM)+CHIMASSORB 119 (RTM)+compound of the formula (B-3-a) wherein $E_{12}$ is hydrogen
27. TINUVIN 622 (RTM)+CHIMASSORB 119 (RTM)+HOSTAVIN N 24 (RTM)
28. TINUVIN 622 (RTM)+CHIMASSORB 119 (RTM)+DI-ACETAM 5 (RTM)
29. TINUVIN 622 (RTM)+CHIMASSORB 119 (RTM)+ADK STAB LA 52 (RTM)
30. TINUVIN 622 (RTM)+CHIMASSORB 119 (RTM)+ADK STAB LA 57 (RTM)
31. TINUVIN 622 (RTM)+CHIMASSORB 119 (RTM)+ADK STAB LA 62 (RTM)
32. TINUVIN 622 (RTM)+CHIMASSORB 119 (RTM)+ADK STAB LA 67 (RTM)
33. TINUVIN 622 (RTM)+CHIMASSORB 119 (RTM)+GOODRITE UV 3034 (RTM)
34. TINUVIN 622 (RTM)+CHIMASSORB 119 (RTM)+GOODRITE UV 3150 (RTM)
35. TINUVIN 622 (RTM)+CHIMASSORB 119 (RTM)+GOODRITE UV 3159 (RTM)
36. TINUVIN 622 (RTM)+CHIMASSORB 119 (RTM)+compound of the formula (B-9-a) wherein $E_{25}$ is hydrogen
37. TINUVIN 622 (RTM)+CHIMASSORB 119 (RTM)+UVINUL 4049 (RTM)
38. TINUVIN 622 (RTM)+CHIMASSORB 119 (RTM)+compound of the formula (B-10-a) wherein $E_{29}$ is hydrogen
39. TINUVIN 622 (RTM)+CHIMASSORB 119 (RTM)+compound of the formula (B-1-a) wherein $E_1$ is hydrogen
40. TINUVIN 622 (RTM)+CHIMASSORB 119 (RTM)+SUMISORB TM 61 (RTM)
41. TINUVIN 622 (RTM)+CHIMASSORB 119 (RTM)+SANDUVOR 3050 (RTM)
42. TINUVIN 622 (RTM)+CHIMASSORB 119 (RTM)+SANDUVOR PR-31 (RTM)
43. TINUVIN 622 (RTM)+CHIMASSORB 2020 (RTM)+TINUVIN 770 (RTM)
44. TINUVIN 622 (RTM)+CHIMASSORB 2020 (RTM)+TINUVIN 765 (RTM)
45. TINUVIN 622 (RTM)+CHIMASSORB 2020 (RTM)+TINUVIN 144 (RTM)
46. TINUVIN 622 (RTM)+CHIMASSORB 2020 (RTM)+TINUVIN 123 (RTM)
47. TINUVIN 622 (RTM)+CHIMASSORB 2020 (RTM)+compound of the formula (B-3-a) wherein $E_{12}$ is hydrogen
48. TINUVIN 622 (RTM)+CHIMASSORB 2020 (RTM)+HOSTAVIN N 24 (RTM)
49. TINUVIN 622 (RTM)+CHIMASSORB 2020 (RTM)+DIACETAM 5 (RTM)
50. TINUVIN 622 (RTM)+CHIMASSORB 2020 (RTM)+ADK STAB LA 52 (RTM)
51. TINUVIN 622 (RTM)+CHIMASSORB 2020 (RTM)+ADK STAB LA 57 (RTM)
52. TINUVIN 622 (RTM)+CHIMASSORB 2020 (RTM)+ADK STAB LA 62 (RTM)
53. TINUVIN 622 (RTM)+CHIMASSORB 2020 (RTM)+ADK STAB LA 67 (RTM)

54. TINUVIN 622 (RTM)+CHIMASSORB 2020 (RTM)+ GOODRITE UV 3034 (RTM)
55. TINUVIN 622 (RTM)+CHIMASSORB 2020 (RTM)+ GOODRITE UV 3150 (RTM)
56. TINUVIN 622 (RTM)+CHIMASSORB 2020 (RTM)+ GOODRITE UV 3159 (RTM)
57. TINUVIN 622 (RTM)+CHIMASSORB 2020 (RTM)+ compound of the formula (B-9-a) wherein $E_{25}$ is hydrogen
58. TINUVIN 622 (RTM)+CHIMASSORB 2020 (RTM)+ UVINUL 4049 (RTM)
59. TINUVIN 622 (RTM)+CHIMASSORB 2020 (RTM)+ compound of the formula (B-10-a) wherein $E_{29}$ is hydrogen
60. TINUVIN 622 (RTM)+CHIMASSORB 2020 (RTM)+ compound of the formula (B-1-a) wherein $E_1$ is hydrogen
61. TINUVIN 622 (RTM)+CHIMASSORB 2020 (RTM)+ SUMISORB TM 61 (RTM)
62. TINUVIN 622 (RTM)+CHIMASSORB 2020 (RTM)+ SANDUVOR 3050 (RTM)
63. TINUVIN 622 (RTM)+CHIMASSORB 2020 (RTM)+ SANDUVOR PR-31 (RTM)
64. TINUVIN 622 (RTM)+CYASORB UV 3346 (RTM)+ TINUVIN 770 (RTM)
65. TINUVIN 622 (RTM)+CYASORB UV 3346 (RTM)+ TINUVIN 765 (RTM)
66. TINUVIN 622 (RTM)+CYASORB UV 3346 (RTM)+ TINUVIN 144 (RTM)
67. TINUVIN 622 (RTM)+CYASORB UV 3346 (RTM)+ TINUVIN 123 (RTM)
68. TINUVIN 622 (RTM)+CYASORB UV 3346 (RTM)+ compound of the formula (B-3-a) wherein $E_{12}$ is hydrogen
69. TINUVIN 622 (RTM)+CYASORB UV 3346 (RTM)+ HOSTAVIN N 24 (RTM)
70. TINUVIN 622 (RTM)+CYASORB UV 3346 (RTM)+ DIACETAM 5 (RTM)
71. TINUVIN 622 (RTM)+CYASORB UV 3346 (RTM)+ ADK STAB LA 52 (RTM)
72. TINUVIN 622 (RTM)+CYASORB UV 3346 (RTM)+ ADK STAB LA 57 (RTM)
73. TINUVIN 622 (RTM)+CYASORB UV 3346 (RTM)+ ADK STAB LA 62 (RTM)
74. TINUVIN 622 (RTM)+CYASORB UV 3346 (RTM)+ ADK STAB LA 67 (RTM)
75. TINUVIN 622 (RTM)+CYASORB UV 3346 (RTM)+ GOODRITE UV 3034 (RTM)
76. TINUVIN 622 (RTM)+CYASORB UV 3346 (RTM)+ GOODRITE UV 3150 (RTM)
77. TINUVIN 622 (RTM)+CYASORB UV 3346 (RTM)+ GOODRITE UV 3159 (RTM)
78. TINUVIN 622 (RTM)+CYASORB UV 3346 (RTM)+ compound of the formula (B-9-a) wherein $E_{25}$ is hydrogen
79. TINUVIN 622 (RTM)+CYASORB UV 3346 (RTM)+ UVINUL 4049 (RTM)
80. TINUVIN 622 (RTM)+CYASORB UV 3346 (RTM)+ compound of the formula (B-10-a) wherein $E_{29}$ is hydrogen
81. TINUVIN 622 (RTM)+CYASORB UV 3346 (RTM)+ compound of the formula (B-1-a) wherein $E_1$ is hydrogen
82. TINUVIN 622 (RTM)+CYASORB UV 3346 (RTM)+ SUMISORB TM 61 (RTM)
83. TINUVIN 622 (RTM)+CYASORB UV 3346 (RTM)+ SANDUVOR 3050 (RTM)
84. TINUVIN 622 (RTM)+CYASORB UV 3346 (RTM)+ SANDUVOR PR-31 (RTM)
85. TINUVIN 622 (RTM)+UVASIL 299 (RTM)+TINUVIN 770 (RTM)
86. TINUVIN 622 (RTM)+UVASIL 299 (RTM)+TINUVIN 765 (RTM)
87. TINUVIN 622 (RTM)+UVASIL 299 (RTM)+TINUVIN 144 (RTM)
88. TINUVIN 622 (RTM)+UVASIL 299 (RTM)+TINUVIN 123 (RTM)
89. TINUVIN 622 (RTM)+UVASIL 299 (RTM)+compound of the formula (B-3-a) wherein $E_{12}$ is hydrogen
90. TINUVIN 622 (RTM)+UVASIL 299 (RTM)+HOSTAVIN N 24 (RTM)
91. TINUVIN 622 (RTM)+UVASIL 299 (RTM)+DIACETAM 5 (RTM)
92. TINUVIN 622 (RTM)+UVASIL 299 (RTM)+ADK STAB LA 52 (RTM)
93. TINUVIN 622 (RTM)+UVASIL 299 (RTM)+ADK STAB LA 57 (RTM)
94. TINUVIN 622 (RTM)+UVASIL 299 (RTM)+ADK STAB LA 62 (RTM)
95. TINUVIN 622 (RTM)+UVASIL 299 (RTM)+ADK STAB LA 67 (RTM)
96. TINUVIN 622 (RTM)+UVASIL 299 (RTM)+GOODRITE UV 3034 (RTM)
97. TINUVIN 622 (RTM)+UVASIL 299 (RTM)+GOODRITE UV 3150 (RTM)
98. TINUVIN 622 (RTM)+UVASIL 299 (RTM)+GOODRITE UV 3159 (RTM)
99. TINUVIN 622 (RTM)+UVASIL 299 (RTM)+compound of the formula (B-9-a) wherein $E_{25}$ is hydrogen
100. TINUVIN 622 (RTM)+UVASIL 299 (RTM)+UVINUL 4049 (RTM)
101. TINUVIN 622 (RTM)+UVASIL 299 (RTM)+compound of the formula (B-10-a) wherein $E_{29}$ is hydrogen
102. TINUVIN 622 (RTM)+UVASIL 299 (RTM)+compound of the formula (B-1-a) wherein $E_1$ is hydrogen
103. TINUVIN 622 (RTM)+UVASIL 299 (RTM)+SUMISORB TM 61 (RTM)
104. TINUVIN 622 (RTM)+UVASIL 299 (RTM)+SANDUVOR 3050 (RTM)
105. TINUVIN 622 (RTM)+UVASIL 299 (RTM)+SANDUVOR PR-31 (RTM)
106. TINUVIN 622 (RTM)+UVASORB HA 88 (RTM)+ TINUVIN 770 (RTM)
107. TINUVIN 622 (RTM)+UVASORB HA 88 (RTM)+ TINUVIN 765 (RTM)
108. TINUVIN 622 (RTM)+UVASORB HA 88 (RTM)+ TINUVIN 144 (RTM)
109. TINUVIN 622 (RTM)+UVASORB HA 88 (RTM)+ TINUVIN 123 (RTM)
110. TINUVIN 622 (RTM)+UVASORB HA 88 (RTM)+ compound of the formula (B-3-a) wherein $E_{12}$ is hydrogen
111. TINUVIN 622 (RTM)+UVASORB HA 88 (RTM)+ HOSTAVIN N 24 (RTM)
112. TINUVIN 622 (RTM)+UVASORB HA 88 (RTM)+DIACETAM 5 (RTM)
113. TINUVIN 622 (RTM)+UVASORB HA 88 (RTM)+ ADK STAB LA 52 (RTM)
114. TINUVIN 622 (RTM)+UVASORB HA 88 (RTM)+ ADK STAB LA 57 (RTM)
115. TINUVIN 622 (RTM)+UVASORB HA 88 (RTM)+ ADK STAB LA 62 (RTM)
116. TINUVIN 622 (RTM)+UVASORB HA 88 (RTM)+ ADK STAB LA 67 (RTM)
117. TINUVIN 622 (RTM)+UVASORB HA 88 (RTM)+ GOODRITE UV 3034 (RTM)
118. TINUVIN 622 (RTM)+UVASORB HA 88 (RTM)+ GOODRITE UV 3150 (RTM)

119. TINUVIN 622 (RTM)+UVASORB HA 88 (RTM)+ GOODRITE UV 3159 (RTM)
120. TINUVIN 622 (RTM)+UVASORB HA 88 (RTM)+ compound of the formula (B-9-a) wherein $E_{25}$ is hydrogen
121. TINUVIN 622 (RTM)+UVASORB HA 88 (RTM)+ UVINUL 4049 (RTM)
122. TINUVIN 622 (RTM)+UVASORB HA 88 (RTM)+ compound of the formula (B-10-a) wherein $E_{29}$ is hydrogen
123. TINUVIN 622 (RTM)+UVASORB HA 88 (RTM)+ compound of the formula (B-1-a) wherein $E_1$ is hydrogen
124. TINUVIN 622 (RTM)+UVASORB HA 88 (RTM)+ SUMISORB TM 61 (RTM)
125. TINUVIN 622 (RTM)+UVASORB HA 88 (RTM)+ SANDUVOR 3050 (RTM)
126. TINUVIN 622 (RTM)+UVASORB HA 88 (RTM)+ SANDUVOR PR-31 (RTM)
127. TINUVIN 622 (RTM)+UVINUL 5050H (RTM)+ TINUVIN 770 (RTM)
128. TINUVIN 622 (RTM)+UVINUL 5050H (RTM)+ TINUVIN 765 (RTM)
129. TINUVIN 622 (RTM)+UVINUL 5050H (RTM)+ TINUVIN 144 (RTM)
130. TINUVIN 622 (RTM)+UVINUL 5050H (RTM)+ TINUVIN 123 (RTM)
131. TINUVIN 622 (RTM)+UVINUL 5050H (RTM)+compound of the formula (B-3-a) wherein $E_{12}$ is hydrogen
132. TINUVIN 622 (RTM)+UVINUL 5050H (RTM)+HOSTAVIN N 24 (RTM)
133. TINUVIN 622 (RTM)+UVINUL 5050H (RTM)+DIACETAM 5 (RTM)
134. TINUVIN 622 (RTM)+UVINUL 5050H (RTM)+ADK STAB LA 52 (RTM)
135. TINUVIN 622 (RTM)+UVINUL 5050H (RTM)+ADK STAB LA 57 (RTM)
136. TINUVIN 622 (RTM)+UVINUL 5050H (RTM)+ADK STAB LA 62 (RTM)
137. TINUVIN 622 (RTM)+UVINUL 5050H (RTM)+ADK STAB LA 67 (RTM)
138. TINUVIN 622 (RTM)+UVINUL 5050H (RTM)+GOODRITE UV 3034 (RTM)
139. TINUVIN 622 (RTM)+UVINUL 5050H (RTM)+GOODRITE UV 3150 (RTM)
140. TINUVIN 622 (RTM)+UVINUL 5050H (RTM)+GOODRITE UV 3159 (RTM)
141. TINUVIN 622 (RTM)+UVINUL 5050H (RTM)+compound of the formula (B-9-a) wherein $E_{25}$ is hydrogen
142. TINUVIN 622 (RTM)+UVINUL 5050H (RTM)+ UVINUL 4049 (RTM)
143. TINUVIN 622 (RTM)+UVINUL 5050H (RTM)+compound of the formula (B-10-a) wherein $E_{29}$ is hydrogen
144. TINUVIN 622 (RTM)+UVINUL 5050H (RTM)+compound of the formula (B-1-a) wherein $E_1$ is hydrogen
145. TINUVIN 622 (RTM)+UVINUL 5050H (RTM)+ SUMISORB TM 61 (RTM)
146. TINUVIN 622 (RTM)+UVINUL 5050H (RTM)+ SANDUVOR 3050 (RTM)
147. TINUVIN 622 (RTM)+UVINUL 5050H (RTM)+ SANDUVOR PR-31 (RTM)
148. TINUVIN 622 (RTM)+LICHTSCHUTZSTOFF UV 31 (RTM)+TINUVIN 770 (RTM)
149. TINUVIN 622 (RTM)+LICHTSCHUTZSTOFF UV 31 (RTM)+TINUVIN 765 (RTM)
150. TINUVIN 622 (RTM)+LICHTSCHUTZSTOFF UV 31 (RTM)+TINUVIN 144 (RTM)
151. TINUVIN 622 (RTM)+LICHTSCHUTZSTOFF UV 31 (RTM)+TINUVIN 123 (RTM)
152. TINUVIN 622 (RTM)+LICHTSCHUTZSTOFF UV 31 (RTM)+compound of the formula (B-3-a) wherein $E_{12}$ is hydrogen
153. TINUVIN 622 (RTM)+LICHTSCHUTZSTOFF UV 31 (RTM)+HOSTAVIN N 24 (RTM)
154. TINUVIN 622 (RTM)+LICHTSCHUTZSTOFF UV 31 (RTM)+DIACETAM 5 (RTM)
155. TINUVIN 622 (RTM)+LICHTSCHUTZSTOFF UV 31 (RTM)+ADK STAB LA 52 (RTM)
156. TINUVIN 622 (RTM)+LICHTSCHUTZSTOFF UV 31 (RTM)+ADK STAB LA 57 (RTM)
157. TINUVIN 622 (RTM)+LICHTSCHUTZSTOFF UV 31 (RTM)+ADK STAB LA 62 (RTM)
158. TINUVIN 622 (RTM)+LICHTSCHUTZSTOFF UV 31 (RTM)+ADK STAB LA 67 (RTM)
159. TINUVIN 622 (RTM)+LICHTSCHUTZSTOFF UV 31 (RTM)+GOODRITE UV 3034 (RTM)
160. TINUVIN 622 (RTM)+LICHTSCHUTZSTOFF UV 31 (RTM)+GOODRITE UV 3150 (RTM)
161. TINUVIN 622 (RTM)+LICHTSCHUTZSTOFF UV 31 (RTM)+GOODRITE UV 3159 (RTM)
162. TINUVIN 622 (RTM)+LICHTSCHUTZSTOFF UV 31 (RTM)+compound of the formula (B-9-a) wherein $E_{25}$ is hydrogen
163. TINUVIN 622 (RTM)+LICHTSCHUTZSTOFF UV 31 (RTM)+UVINUL 4049 (RTM)
164. TINUVIN 622 (RTM)+LICHTSCHUTZSTOFF UV 31 (RTM)+compound of the formula (B-10-a) wherein $E_{29}$ is hydrogen
165. TINUVIN 622 (RTM)+LICHTSCHUTZSTOFF UV 31 (RTM)+compound of the formula (B-1-a) wherein $E_1$ is hydrogen
166. TINUVIN 622 (RTM)+LICHTSCHUTZSTOFF UV 31 (RTM)+SUMISORB TM 61 (RTM)
167. TINUVIN 622 (RTM)+LICHTSCHUTZSTOFF UV 31 (RTM)+SANDUVOR 3050 (RTM)
168. TINUVIN 622 (RTM)+LICHTSCHUTZSTOFF UV 31 (RTM)+SANDUVOR PR-31 (RTM)
169. TINUVIN 622 (RTM)+DASTIB 1082 (RTM)+TINUVIN 770 (RTM)
170. TINUVIN 622 (RTM)+DASTIB 1082 (RTM)+TINUVIN 765 (RTM)
171. TINUVIN 622 (RTM)+DASTIB 1082 (RTM)+TINUVIN 144 (RTM)
172. TINUVIN 622 (RTM)+DASTIB 1082 (RTM)+TINUVIN 123 (RTM)
173. TINUVIN 622 (RTM)+DASTIB 1082 (RTM)+compound of the formula (B-3-a) wherein $E_{12}$ is hydrogen
174. TINUVIN 622 (RTM)+DASTIB 1082 (RTM)+HOSTAVIN N 24 (RTM)
175. TINUVIN 622 (RTM)+DASTIB 1082 (RTM)+DIACETAM 5 (RTM)
176. TINUVIN 622 (RTM)+DASTIB 1082 (RTM)+ADK STAB LA 52 (RTM)
177. TINUVIN 622 (RTM)+DASTIB 1082 (RTM)+ADK STAB LA 57 (RTM)
178. TINUVIN 622 (RTM)+DASTIB 1082 (RTM)+ADK STAB LA 62 (RTM)
179. TINUVIN 622 (RTM)+DASTIB 1082 (RTM)+ADK STAB LA 67 (RTM)
180. TINUVIN 622 (RTM)+DASTIB 1082 (RTM)+GOODRITE UV 3034 (RTM)
181. TINUVIN 622 (RTM)+DASTIB 1082 (RTM)+GOODRITE UV 3150 (RTM)
182. TINUVIN 622 (RTM)+DASTIB 1082 (RTM)+GOODRITE UV 3159 (RTM)

183. TINUVIN 622 (RTM)+DASTIB 1082 (RTM)+compound of the formula (B-9-a) wherein $E_{25}$ is hydrogen
184. TINUVIN 622 (RTM)+DASTIB 1082 (RTM)+UVINUL 4049 (RTM)
185. TINUVIN 622 (RTM)+DASTIB 1082 (RTM)+compound of the formula (B-10-a) wherein $E_{29}$ is hydrogen
186. TINUVIN 622 (RTM)+DASTIB 1082 (RTM)+compound of the formula (B-1-a) wherein $E_1$ is hydrogen
187. TINUVIN 622 (RTM)+DASTIB 1082 (RTM)+SUMISORB TM 61 (RTM)
188. TINUVIN 622 (RTM)+DASTIB 1082 (RTM)+SANDUVOR 3050 (RTM)
189. TINUVIN 622 (RTM)+DASTIB 1082 (RTM)+SANDUVOR PR-31 (RTM)
190. TINUVIN 622 (RTM)+LUCHEM HA B 18 (RTM)+TINUVIN 770 (RTM)
191. TINUVIN 622 (RTM)+LUCHEM HA B 18 (RTM)+TINUVIN 765 (RTM)
192. TINUVIN 622 (RTM)+LUCHEM HA B 18 (RTM)+TINUVIN 144 (RTM)
193. TINUVIN 622 (RTM)+LUCHEM HA B 18 (RTM)+TINUVIN 123 (RTM)
194. TINUVIN 622 (RTM)+LUCHEM HA B 18 (RTM)+compound of the formula (B-3-a) wherein $E_{12}$ is hydrogen
195. TINUVIN 622 (RTM)+LUCHEM HA B 18 (RTM)+HOSTAVIN N 24 (RTM)
196. TINUVIN 622 (RTM)+LUCHEM HA B 18 (RTM)+DIACETAM 5 (RTM)
197. TINUVIN 622 (RTM)+LUCHEM HA B 18 (RTM)+ADK STAB LA 52 (RTM)
198. TINUVIN 622 (RTM)+LUCHEM HA B 18 (RTM)+ADK STAB LA 57 (RTM)
199. TINUVIN 622 (RTM)+LUCHEM HA B 18 (RTM)+ADK STAB LA 62 (RTM)
200. TINUVIN 622 (RTM)+LUCHEM HA B 18 (RTM)+ADK STAB LA 67 (RTM)
201. TINUVIN 622 (RTM)+LUCHEM HA B 18 (RTM)+GOODRITE UV 3034 (RTM)
202. TINUVIN 622 (RTM)+LUCHEM HA B 18 (RTM)+GOODRITE UV 3150 (RTM)
203. TINUVIN 622 (RTM)+LUCHEM HA B 18 (RTM)+GOODRITE UV 3159 (RTM)
204. TINUVIN 622 (RTM)+LUCHEM HA B 18 (RTM)+compound of the formula (B-9-a) wherein $E_{25}$ is hydrogen
205. TINUVIN 622 (RTM)+LUCHEM HA B 18 (RTM)+UVINUL 4049 (RTM)
206. TINUVIN 622 (RTM)+LUCHEM HA B 18 (RTM)+compound of the formula (B-10-a) wherein $E_{29}$ is hydrogen
207. TINUVIN 622 (RTM)+LUCHEM HA B 18 (RTM)+compound of the formula (B-1-a) wherein $E_1$ is hydrogen
208. TINUVIN 622 (RTM)+LUCHEM HA B 18 (RTM)+SUMISORB TM 61 (RTM)
209. TINUVIN 622 (RTM)+LUCHEM HA B 18 (RTM)+SANDUVOR 3050 (RTM)
210. TINUVIN 622 (RTM)+LUCHEM HA B 18 (RTM)+SANDUVOR PR-31 (RTM)
211. TINUVIN 622 (RTM)+ADK STAB LA 63 (RTM)+TINUVIN 770 (RTM)
212. TINUVIN 622 (RTM)+ADK STAB LA 63 (RTM)+TINUVIN 765 (RTM)
213. TINUVIN 622 (RTM)+ADK STAB LA 63 (RTM)+TINUVIN 144 (RTM)
214. TINUVIN 622 (RTM)+ADK STAB LA 63 (RTM)+TINUVIN 123 (RTM)
215. TINUVIN 622 (RTM)+ADK STAB LA 63 (RTM)+compound of the formula (B-3-a) wherein $E_{12}$ is hydrogen
216. TINUVIN 622 (RTM)+ADK STAB LA 63 (RTM)+HOSTAVIN N 24 (RTM)
217. TINUVIN 622 (RTM)+ADK STAB LA 63 (RTM)+DIACETAM 5 (RTM)
218. TINUVIN 622 (RTM)+ADK STAB LA 63 (RTM)+ADK STAB LA 52 (RTM)
219. TINUVIN 622 (RTM)+ADK STAB LA 63 (RTM)+ADK STAB LA 57 (RTM)
220. TINUVIN 622 (RTM)+ADK STAB LA 63 (RTM)+ADK STAB LA 62 (RTM)
221. TINUVIN 622 (RTM)+ADK STAB LA 63 (RTM)+ADK STAB LA 67 (RTM)
222. TINUVIN 622 (RTM)+ADK STAB LA 63 (RTM)+GOODRITE UV 3034 (RTM)
223. TINUVIN 622 (RTM)+ADK STAB LA 63 (RTM)+GOODRITE UV 3150 (RTM)
224. TINUVIN 622 (RTM)+ADK STAB LA 63 (RTM)+GOODRITE UV 3159 (RTM)
225. TINUVIN 622 (RTM)+ADK STAB LA 63 (RTM)+compound of the formula (B-9-a) wherein $E_{25}$ is hydrogen
226. TINUVIN 622 (RTM)+ADK STAB LA 63 (RTM)+UVINUL 4049 (RTM)
227. TINUVIN 622 (RTM)+ADK STAB LA 63 (RTM)+compound of the formula (B-10-a) wherein $E_{29}$ is hydrogen
228. TiNUVIN 622 (RTM)+ADK STAB LA 63 (RTM)+compound of the formula (B-1-a) wherein $E_1$ is hydrogen
229. TINUVIN 622 (RTM)+ADK STAB LA 63 (RTM)+SUMISORB TM 61 (RTM)
230. TINUVIN 622 (RTM)+ADK STAB LA 63 (RTM)+SANDUVOR 3050 (RTM)
231. TINUVIN 622 (RTM)+ADK STAB LA 63 (RTM)+SANDUVOR PR-31 (RTM)
232. TINUVIN 622 (RTM)+ADK STAB LA 68 (RTM)+TINUVIN 770 (RTM)
233. TINUVIN 622 (RTM)+ADK STAB LA 68 (RTM)+TINUVIN 765 (RTM)
234. TINUVIN 622 (RTM)+ADK STAB LA 68 (RTM)+TINUVIN 144 (RTM)
235. TINUVIN 622 (RTM)+ADK STAB LA 68 (RTM)+TINUVIN 123 (RTM)
236. TINUVIN 622 (RTM)+ADK STAB LA 68 (RTM)+compound of the formula (B-3-a) wherein $E_{12}$ is hydrogen
237. TINUVIN 622 (RTM)+ADK STAB LA 68 (RTM)+HOSTAVIN N 24 (RTM)
238. TINUVIN 622 (RTM)+ADK STAB LA 68 (RTM)+DIACETAM 5 (RTM)
239. TINUVIN 622 (RTM)+ADK STAB LA 68 (RTM)+ADK STAB LA 52 (RTM)
240. TINUVIN 622 (RTM)+ADK STAB LA 68 (RTM)+ADK STAB LA 57 (RTM)
241. TINUVIN 622 (RTM)+ADK STAB LA 68 (RTM)+ADK STAB LA 62 (RTM)
242. TINUVIN 622 (RTM)+ADK STAB LA 68 (RTM)+ADK STAB LA 67 (RTM)
243. TINUVIN 622 (RTM)+ADK STAB LA 68 (RTM)+GOODRITE UV 3034 (RTM)
244. TINUVIN 622 (RTM)+ADK STAB LA 68 (RTM)+GOODRITE UV 3150 (RTM)
245. TINUVIN 622 (RTM)+ADK STAB LA 68 (RTM)+GOODRITE UV 3159 (RTM)
246. TINUVIN 622 (RTM)+ADK STAB LA 68 (RTM)+compound of the formula (B-9-a) wherein $E_{25}$ is hydrogen
247. TINUVIN 622 (RTM)+ADK STAB LA 68 (RTM)+UVINUL 4049 (RTM)

248. TINUVIN 622 (RTM)+ADK STAB LA 68 (RTM)+ compound of the formula (B-10-a) wherein $E_{29}$ is hydrogen
249. TINUVIN 622 (RTM)+ADK STAB LA 68 (RTM)+ compound of the formula (B-1-a) wherein $E_1$ is hydrogen
250. TINUVIN 622 (RTM)+ADK STAB LA 68 (RTM)+ SUMISORB TM 61 (RTM)
251. TINUVIN 622 (RTM)+ADK STAB LA 68 (RTM)+ SANDUVOR 3050 (RTM)
252. TINUVIN 622 (RTM)+ADK STAB LA 68 (RTM)+ SANDUVOR PR-31 (RTM)
253. TINUVIN 622 (RTM)+CYASORB UV 3529 (RTM)+ TINUVIN 770 (RTM)
254. TINUVIN 622 (RTM)+CYASORB UV 3529 (RTM)+ TINUVIN 765 (RTM)
255. TINUVIN 622 (RTM)+CYASORB UV 3529 (RTM)+ TINUVIN 144 (RTM)
256. TINUVIN 622 (RTM)+CYASORB UV 3529 (RTM)+ TINUVIN 123 (RTM)
257. TINUVIN 622 (RTM)+CYASORB UV 3529 (RTM)+ compound of the formula (B-3-a) wherein $E_{12}$ is hydrogen
258. TINUVIN 622 (RTM)+CYASORB UV 3529 (RTM)+ HOSTAVIN N 24 (RTM)
259. TINUVIN 622 (RTM)+CYASORB UV 3529 (RTM)+ DIACETAM 5 (RTM)
260. TINUVIN 622 (RTM)+CYASORB UV 3529 (RTM)+ ADK STAB LA 52 (RTM)
261. TINUVIN 622 (RTM)+CYASORB UV 3529 (RTM)+ ADK STAB LA 57 (RTM)
262. TINUVIN 622 (RTM)+CYASORB UV 3529 (RTM)+ ADK STAB LA 62 (RTM)
263. TINUVIN 622 (RTM)+CYASORB UV 3529 (RTM)+ ADK STAB LA 67 (RTM)
264. TINUVIN 622 (RTM)+CYASORB UV 3529 (RTM)+ GOODRITE UV 3034 (RTM)
265. TINUVIN 622 (RTM)+CYASORB UV 3529 (RTM)+ GOODRITE UV 3150 (RTM)
266. TINUVIN 622 (RTM)+CYASORB UV 3529 (RTM)+ GOODRITE UV 3159 (RTM)
267. TINUVIN 622 (RTM)+CYASORB UV 3529 (RTM)+ compound of the formula (B-9-a) wherein $E_{25}$ is hydrogen
268. TINUVIN 622 (RTM)+CYASORB UV 3529 (RTM)+ UVINUL 4049 (RTM)
269. TINUVIN 622 (RTM)+CYASORB UV 3529 (RTM)+ compound of the formula (B-10-a) wherein $E_{29}$ is hydrogen
270. TINUVIN 622 (RTM)+CYASORB UV 3529 (RTM)+ compound of the formula (B-1-a) wherein $E_1$ is hydrogen
271. TINUVIN 622 (RTM)+CYASORB UV 3529 (RTM)+ SUMISORB TM 61 (RTM)
272. TINUVIN 622 (RTM)+CYASORB UV 3529 (RTM)+ SANDUVOR 3050 (RTM)
273. TINUVIN 622 (RTM)+CYASORB UV 3529 (RTM)+ SANDUVOR PR-31 (RTM)

Further examples of stabilizer mixtures are those wherein in the above combinations 1 to 273 the commercial product TINUVIN 622 (RTM) is replaced by a compound of the formula (A-2-a) and/or (A-2-b)

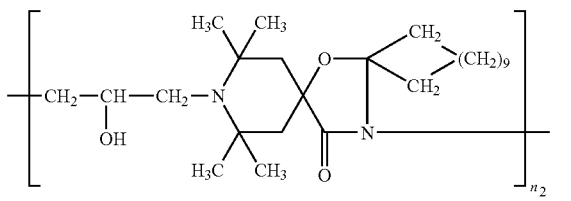

(A-2-a)

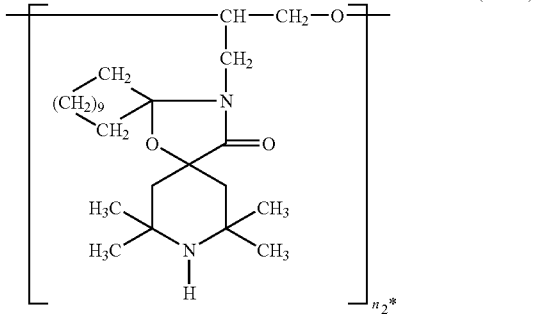

(A-2-b)

wherein $n_2$ and $n_2^*$ are a number from 2 to 20.

Additional examples of stabilizer mixtures are those wherein in the above combinations 1 to 273 the commercial product TINUVIN 622 (RTM) is replaced by a compound of the formula (A-4-a)

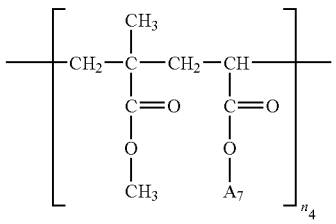

(A-4-a)

wherein $n_4$ is a number from 2 to 20, and
at least 50% of the radicals $A_7$ are a group of the formula

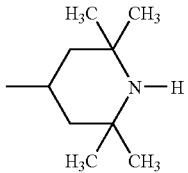

and the
remaining radicals $A_7$ are ethyl.

Combinations of particular interest are number 1 and the corresponding combination wherein TINUVIN 622 (RTM) is replaced by a compound of the formula (A-2-a) and/or (A-2-b), number 85 and the corresponding combination wherein UVASIL 299 (RTM) is replaced by UVASIL 125 (RTM) or UVASIL 2000 (RTM), as well as number 22, 43, 64, 106, 127 and 253.

Further combinations of particular interest are numbers 1, 4, 5, 17 and 23.

The commercial product TINUVIN 622 (RTM) corresponds to the compound of the formula (A-1-a).

The commercial product TINUVIN 770 (RTM) corresponds to the compound of the formula (B-1-b) wherein $E_1$ is hydrogen.

The commercial product TINUVIN 765 (RTM) corresponds to the compound of the formula (B-1-b) wherein $E_1$ is methyl.

The commercial product TINUVIN 123 (RTM) corresponds to the compound of the formula (B-1-b) wherein $E_1$ is octyloxy.

The commercial product TINUVIN 144 (RTM) corresponds to the compound of the formula (B-1-c) wherein $E_1$ is methyl.

The commercial product ADK STAB LA 57 (RTM) corresponds to the compound of the formula (B-1-d) wherein $E_1$ is hydrogen.

The commercial product ADK STAB LA 52 (RTM) corresponds to the compound of the formula (B-1-d) wherein $E_1$ is methyl.

The commercial product ADK STAB LA 67 (RTM) corresponds to the compound of the formula (B-2-a) wherein $E_8$ is hydrogen.

The commercial product ADK STAB LA 62 (RTM) corresponds to the compound of the formula (B-2-a) wherein $E_1$ is methyl.

The commercial product HOSTAVIN N 24 (RTM) corresponds to the compound of the formula (B-3-b) wherein $E_{12}$ is hydrogen.

The commercial product SANDUVOR 3050 (RTM) corresponds to the compound of the formula (B-3-b-1) shown below, wherein $E_{12}$ is hydrogen.

The commercial product DIACETAM 5 (RTM) corresponds to the compound of the formula (B-4-a) wherein $E_{13}$ is hydrogen.

The commercial product SUMISORB TM 61 corresponds to the compound of the formula (B-4-b) wherein $E_{13}$ is hydrogen.

The commercial product UVINUL 4049 (RTM) corresponds to the compound of the formula (B-5) wherein $E_{16}$ is hydrogen.

The commercial product SANDUVOR PR 31 (RTM) corresponds to the compound of the formula (B-8-a) wherein $E_{23}$ is methyl.

The commercial product GOODRITE 3034 (RTM) corresponds to the compound of the formula (B-9-b) wherein $E_{25}$ is hydrogen.

The commercial product GOODRITE 3150 (RTM) corresponds to the compound of the formula (B-9-c) wherein $E_{25}$ is hydrogen.

The commercial product GOODRITE 3159 (RTM) corresponds to the compound of the formula (B-9-c) wherein $E_{25}$ is methyl.

The commercial product CHIMASSORB 944 (RTM) corresponds to the compound of the formula (C-1-a) wherein $R_6$ is hydrogen.

The commercial product CHIMASSORB 2020 (RTM) corresponds to the compound of the formula (C-1-b) wherein $R_6$ is hydrogen.

The commercial product DASTIB 1082 (RTM) corresponds to the compound of the formula (C-1-c) wherein $R_6$ is hydrogen.

The commercial product CYASORB UV 3346 (RTM) corresponds to the compound of the formula (C-1-d) wherein $R_6$ is hydrogen.

The commercial product CYASORB UV 3529 (RTM) corresponds to the compound of the formula (C-1-d) wherein $R_6$ is methyl.

The commercial product CHIMASSORB 119 (RTM) corresponds to the compound of the formula (C-2-a) wherein $R_{13}$ is methyl.

The commercial product UVASIL 299 (RTM) corresponds to the compound of the formula (C-3-a) wherein $R_{16}$ is hydrogen.

The commercial product UVINUL 5050H (RTM) corresponds to the compound of the formula (C-4-a) wherein $R_{18}$ is hydrogen.

The commercial product LICHTSCHUTZSTOFF UV 31 (RTM) corresponds to the compound of the formula (C-4-b) wherein $R_{18}$ is hydrogen.

The commercial product LUCHEM HA B 18 (RTM) corresponds to the compound of the formula (C-4-c) wherein $R_{18}$ is hydrogen.

The commercial product ADK STAB LA 68 (RTM) corresponds to the compound of the formula (C-5-a) wherein $R_{30}$ is hydrogen.

The commercial product ADK STAB LA 63 (RTM) corresponds to the compound of the formula (C-5-a) wherein $R_{30}$ is methyl.

The commercial product UVASORB HA 88 (RTM) corresponds to the product (C-6-a) wherein $R_{32}$ is hydrogen.

The compound of the formula (B-3-b-1) has the following structure:

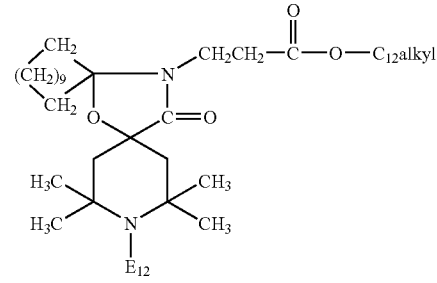

The stabilizer mixture according to this invention is suitable for stabilizing organic materials against degradation induced by light, heat or oxidation. Examples of such organic materials are the following:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).
   b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EM), LLDPE/EVA, LLDPE/EM and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on poly-butadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

This invention therefore additionally relates to a composition comprising an organic material subject to degradation induced by light, heat or oxidation and the stabilizer mixture described herein above.

A further embodiment of the present invention is a method for stabilizing an organic material against degradation induced by light, heat or oxidation, which comprises incorporating into the organic material the stabilizer mixture described herein above.

The organic material is preferably a synthetic polymer, in particular from one of the above groups. Polyolefins are preferred and polyethylene, polypropylene, a polyethylene copolymer and a polypropylene copolymer are particularly preferred.

The components (A), (B) and (C) may be added to the organic material to be stabilized either individually or mixed with one another.

Each of the components (A), (B) and (C) may be present in the organic material in an amount of preferably 0.005 to 5%, in particular 0.01 to 1% or 0.05 to 1%, relative to the weight of the organic material.

The weight ratio of the components (A):(B) or (A):(C) is preferably 10:1 to 1:100, in particular 10:1 to 1:10 or 5:1 to 1:5. Further examples for the weight ratio are also 1:1 to 1:10, for example 1:2 to 1:5.

The above components can be incorporated into the organic material to be stabilized by known methods, for example before or during shaping or by applying the dissolved or dispersed compounds to the organic material, if necessary with subsequent evaporation of the solvent. The components can be added to the organic material in the form of a powder, granules or a masterbatch, which contains these components in, for example, a concentration of from 2.5 to 25% by weight.

If desired, the components (A), (B) and (C) can be blended with each other before incorporation in the organic material. They can be added to a polymer before or during the polymerization or before the crosslinking.

The materials stabilized according to this invention can be used in a wide variety of forms, for example as films, fibres, tapes, moulding compositions, profiles or as binders for paints, adhesives or putties.

The stabilized material may additionally also contain various conventional additives, for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example α-tocopherol, β,-tocopherol, γ-tocopherol, 8-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'- thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tertbutyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydi-benzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-meth-oxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tertbutylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tertbutyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafoso®168, Ciba-Geigy), tris(nonylphenyl) phosphite,

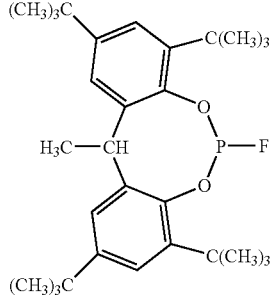

(A)

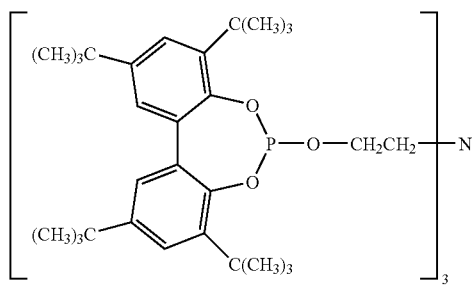

(B)

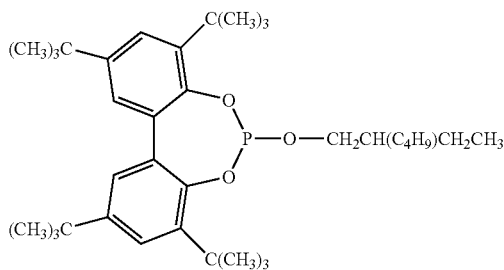

(C)

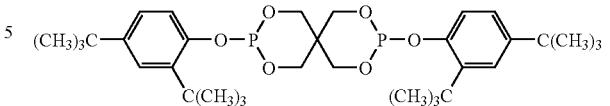

(D)

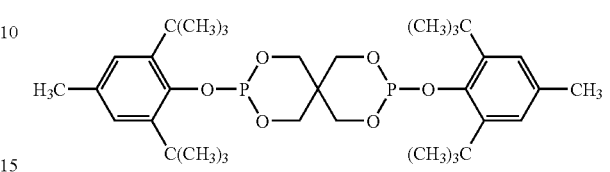

(E)

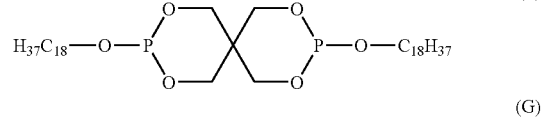

(F)

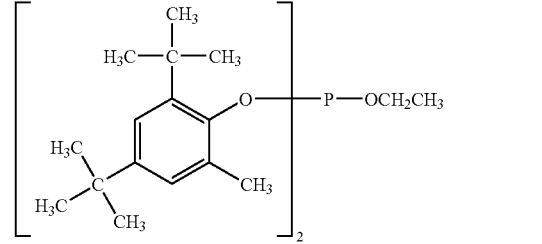

(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydrox-ylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecyinitrone, N-octadecyl-alpha-heptadecylnitrone, N-hexadecyl-alpha-heptadecyinitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of O-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyl-dibenzylidene)sorbitol, and 1,3:2,4-di(benzylidene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The weight ratio of the total amount of components (A), (B) and (C) to the total amount of the conventional additives can be, for example, 100:1 to 1:100 or 10:1 to 1:10.

The examples below illustrate the invention in greater detail. All percentages and parts are by weight, unless stated otherwise.

Light stabilizers used in the following Examples 1 to 4:

TINUVIN 791 (RTM):

Mixture of TINUVIN 770 (RTM) and CHIMASSORB 944 (RTM) in a weight ratio of 1:1.

Compound (B-1-a-1):

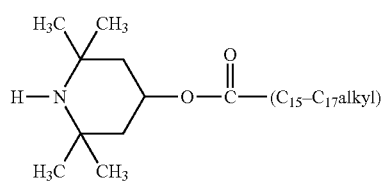

TINUVIN 770 (RTM):

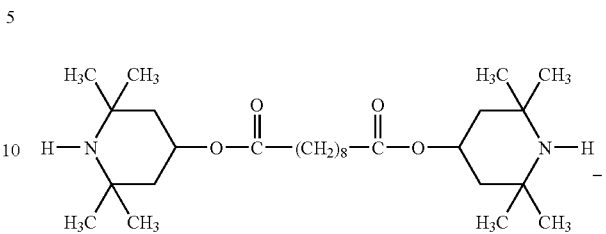

TINUVIN 765 (RTM):

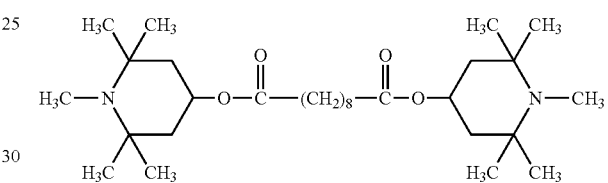

TINUVIN 123 (RTM):

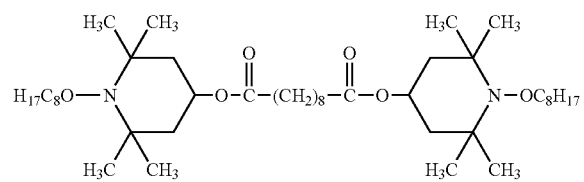

TINUVIN 144 (RTM):

ADK STAB LA 57 (RTM):
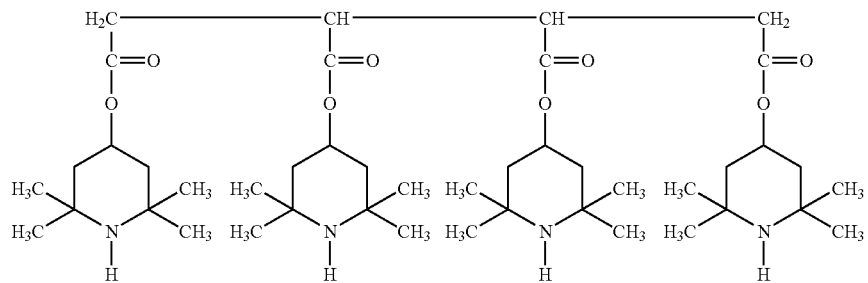
HOSTAVIN N 20 (RTM):
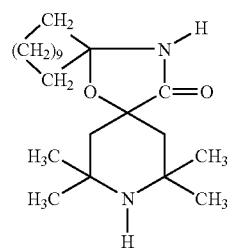
UVINUL 4049 H (RTM)
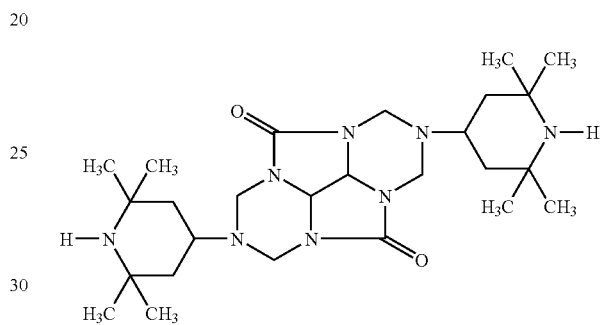
SANDUVOR 3050 (RTM):
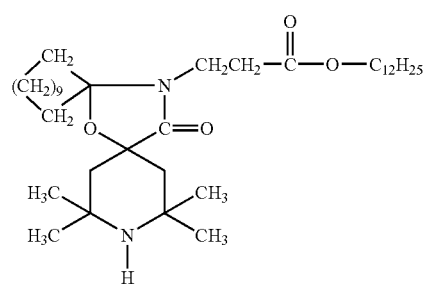
Compound (B-6-a-1):
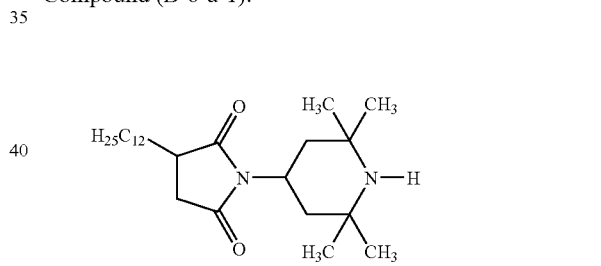
HOSTAVIN N 24 (RTM):
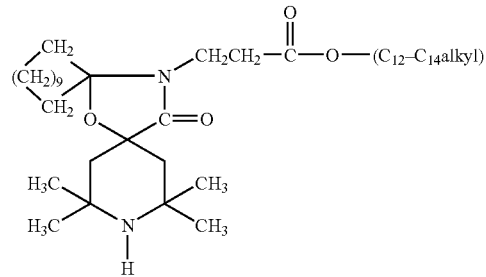
SANDUVOR PR 31 (RTM):
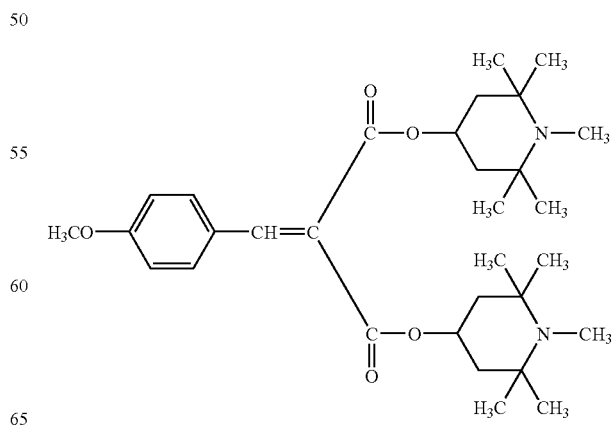

GOODRITE UV 3034 (RTM):
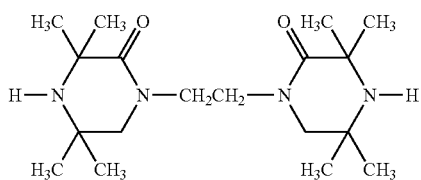
GOODRITE UV 3150 (RTM):
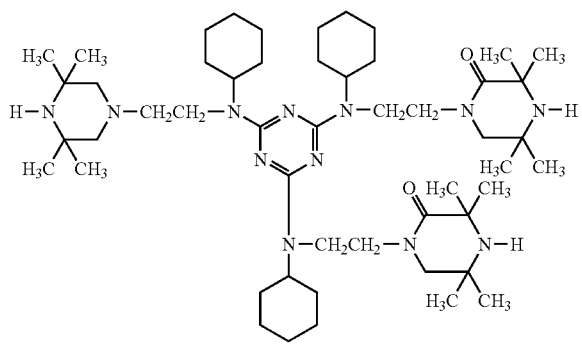
Compound (B-10-a-1):
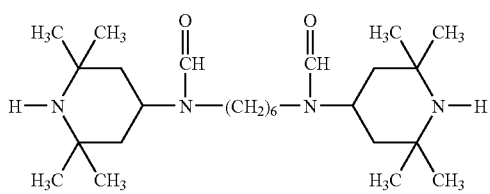
CHIMASSORB 944 (RTM):
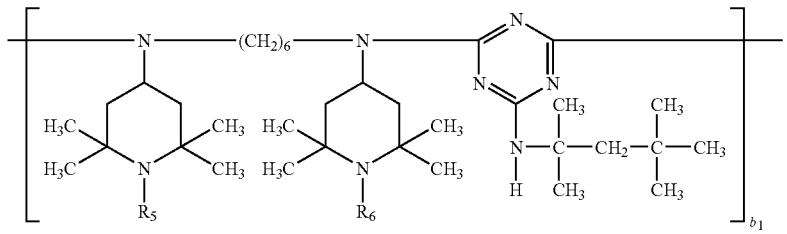
CYASORB UV 3346 (RTM):
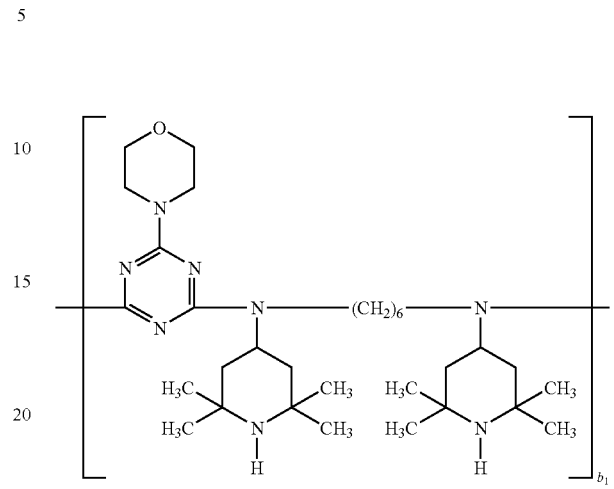
CYASORB UV 3529 (RTM):
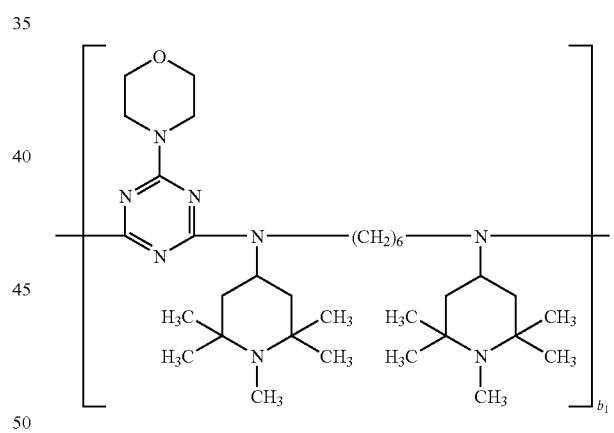

DASTIB 1082 (RTM):
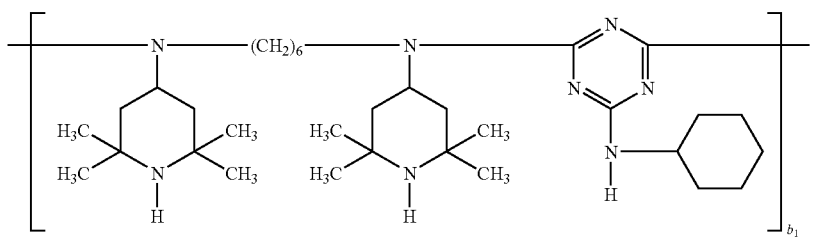
CHIMASSORB 119 (RTM):
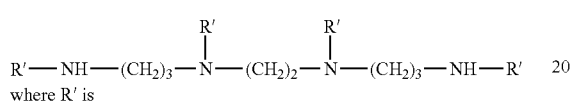
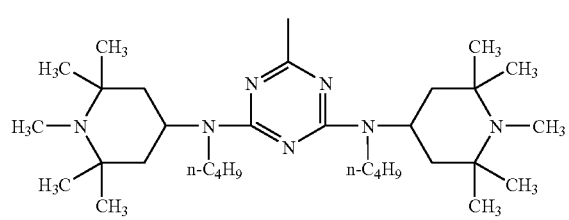
UVASIL 299 (RTM):
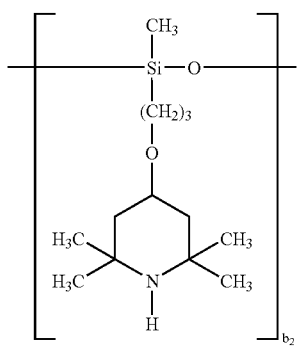
UVASIL 2000 (RTM):
A mixture of UVASIL 299 (RTM) and polypropylene.
UVINUL 5050H (RTM):
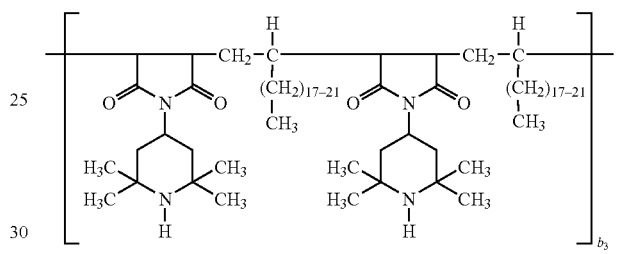
LICHTSCHUTZSTOFF UV 31 (RTM):
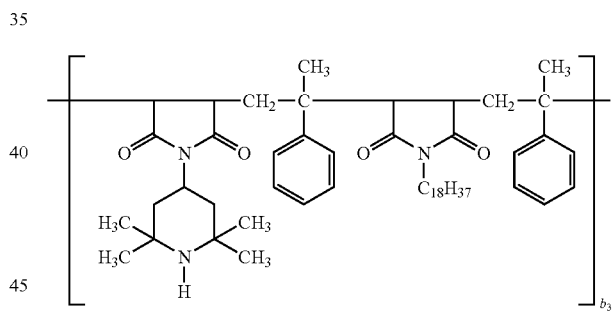
ADK STAB LA 68 (RTM):
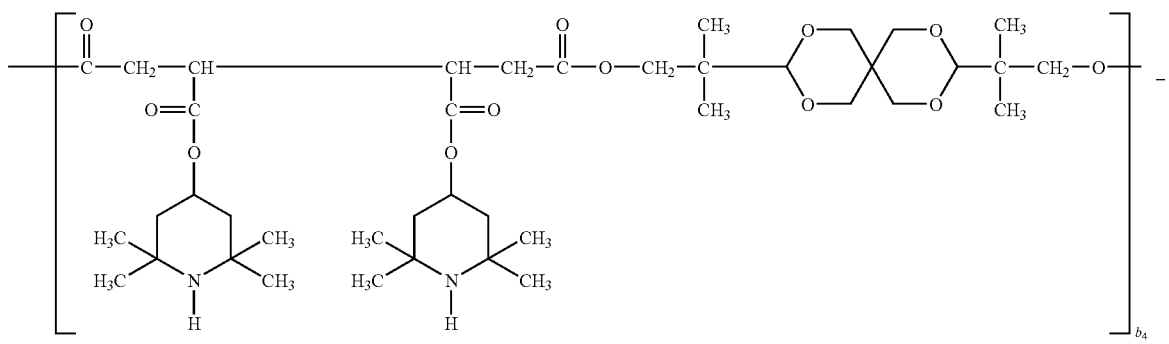

ADK STAB LA 63 (RTM):

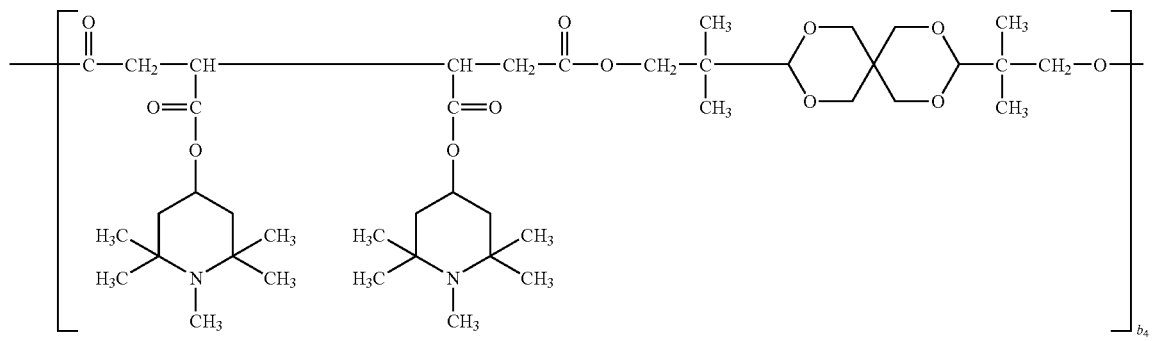

TINUVIN 622 (RTM)

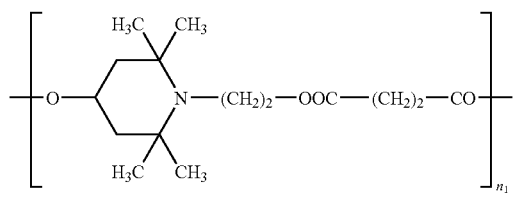

Mixture (A-2):

Mixture of the compounds (A-2-a) and (A-2-b) in a weight ratio of 4:1

(A-2-a)

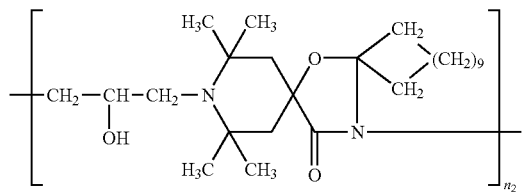

(A-2-b)

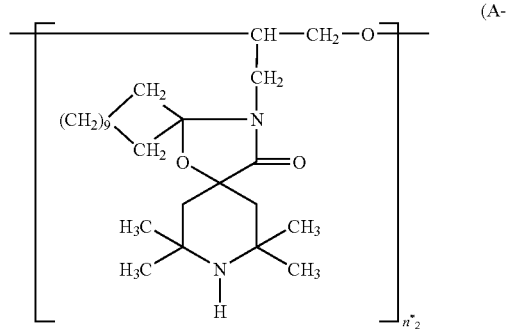

EXAMPLE 1

Light Stabilization of Polypropylene Homopolymer Films 100 parts of unstabilized polypropylene powder (melt flow index: 3.8 g/10 min at 230° C. and 2160 g) are homogenized at 200° C. for 10 min in a Brabender plastograph with 0.05 parts of pentaerythrityl-tetrakis{3-(3,5-di-tert-butyl-4-hydroxyphenyl)propionate}, 0.05 parts of tris{2,4-di-tert-butylphenyl} phosphite, 0.1 parts of Ca stearate, 0.25 parts of titanium dioxide (Anatase) and the stabilizer mixture indicated in Table 1. The material thus obtained is compression molded in a laboratory press between two aluminum foils for 6 min at 260° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C., without water-spraying).

Periodically, these samples are removed from the exposure apparatus and their carbonyl content is measured with an infrared spectrophotometer. The exposure time corresponding to formation of a carbonyl absorbance of 0.1 is a measure for the efficiency of the stabilizer mixture. The values obtained are summarized in Table 1.

TABLE 1

| Stabilizer mixture | Time in hours until 0.1 carbonyl absorbance |
|---|---|
| Control | 220 |
| 0.20% of TINUVIN 791 (RTM) (= prior art) | 4 595 |
| 0.10% of TINUVIN 622 (RTM) plus 0.05% of CHIMASSORB 944 (RTM) plus 0.05% of TINUVIN 770 (RTM) | >5 500 |
| 0.10% of the mixture (A-2) plus 0.05% of CHIMASSORB 944 (RTM) plus 0.05% of TINUVIN 770 (RTM) | >5 500 |

EXAMPLE 2

Light Stabilization of Polyethylene HD Films 100 parts of unstabilized high density polyethylene powder (density: 0.964 g cm$^{-3}$, melt flow index: 5.0 g/10 min at 190° C. and 2160 g) are homogenized at 180° C. for 10 min in a Brabender plastograph with 0.03 parts of octadecyl 3-(3,5-di-tert-butyl-4-hydroxyphenyl)-propionate, 0.1 parts of Ca stearate, 0.25 parts of titanium dioxide (Anatase) and the stabilizer mixture indicated in Table 2. The material thus obtained is compression molded in a laboratory press between two aluminum foils for 6 min at 210° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C., without water-spraying).

Periodically, these samples are removed from the exposure apparatus and their carbonyl content is measured with an infrared spectrophotometer. The exposure time corresponding to formation of a carbonyl absorbance of 0.1 is a measure for the efficiency of the stabilizer mixture. The values obtained are summarized in Table 2.

TABLE 2

| Stabilizer mixture | Time in hours until 0.1 carbonyl absorbance |
|---|---|
| Control | 465 |
| 0.20% of TINUVIN 791 (RTM) (= prior art) | 3 175 |
| 0.10% of the mixture (A-2) plus 0.05% of CHIMASSORB 944 (RTM) plus 0.05% of TINUVIN 770 (RTM) | 4 815 |

EXAMPLE 3

Light Stabilization of Polypropylene Homopolymer Films 100 parts of unstabilized polypropylene powder (melt flow index: ~2.4 g/10 minutes at 230° C. and 2160 g) are homogenized at 200° C. for 10 minutes in a Brabender plastograph with 0.05 parts of pentaerythrityl tetrakis{3-(3,5-di-tert-butyl-4-hydroxyphenyl)propionate}, 0.05 parts of tris{2,4-di-tert-butylphenyl}phosphite, 0.1 parts of Ca stearate, 0.25 parts of titanium dioxide (anatase) and the light stabilizer system indicated in Tables 3A and 3B. The material thus obtained is compression molded in a laboratory press between two aluminum foils for 6 minutes at 260° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C.; without water-spraying).

Periodically, these samples are removed from the exposure apparatus and their carbonyl content is measured with an infrared spectrophotometer.

The exposure time ($T_{0.1}$) corresponding to the formation of a carbonyl absorbance of 0.1 is a measure for the efficiency of the light stabilizer system. The values obtained are summarized in the following Tables 3A and 3B.

TABLE 3A

| Light stabilizer system | $T_{0.1}$ in hours The amount of the light stabilizers used is 0.075% each*). | $T_{0.1}$ in hours Light stabilizer system in combination with TINUVIN 622 (RTM) The amount of the light stabilizers used is 0.05% each*). |
|---|---|---|
| Without | 235 | — |
| TINUVIN 770 (RTM) plus CHIMASSORB 944 (RTM) | 2700 | 2980 |
| TINUVIN 770 (RTM) plus CHIMASSORB 119 (RTM) | 2495 | 3035 |
| TINUVIN 770 (RTM) plus CYASORB UV 3529 (RTM) | 3130 | 3510 |
| TINUVIN 770 (RTM) plus UVINUL 5050 H (RTM) | 2790 | 3295 |
| TINUVIN 770 (RTM) plus DASTIB 1082 (RTM) | 3285 | 3610 |
| TINUVIN 770 (RTM) plus ADK STAB LA 63 (RTM) | 2670 | 2915 |
| TINUVIN 770 (RTM) plus ADK STAB 68 (RTM) | 2725 | 3425 |
| TINUVIN 770 (RTM) plus LICHTSCHUTZSTOFF UV 31 (RTM) | 2320 | 3155 |

*)The overall concentration of the light stabilizers is 0.15%.

TABLE 3B

| Light stabilizer system | $T_{0.1}$ in hours The amount of the light stabilizers used is 0.075% each*). | $T_{0.1}$ in hours Light stabilizer system in combination with TINUVIN 622 (RTM) The amount of the light stabilizers used is 0.05% each*). |
|---|---|---|
| Without | 235 | — |
| CHIMASSORB 944 (RTM) plus TINUVIN 144 (RTM) | 2280 | 3150 |
| CHIMASSORB 944 (RTM) plus TINUVIN 123 (RTM) | 2245 | 2870 |
| CHIMASSORB 944 (RTM) plus HOSTAVIN N 20 (RTM) | 2530 | 3170 |
| CHIMASSORB 944 (RTM) plus GOODRITE UV 3034 (RTM) | 2855 | 3020 |
| CHIMASSORB 944 (RTM) plus GOODRITE UV 3150 (RTM) | 2320 | 2765 |
| CHIMASSORB 944 (RTM) plus Compound (B-6-a-1) | 2780 | 3435 |
| CHIMASSORB 944 (RTM) plus UVINUL 4049 H (RTM) | 2925 | 3265 |
| CHIMASSORB 944 (RTM) plus Compound (B-10-a-1) | 2965 | 3385 |
| CHIMASSORB 944 (RTM) plus Compound (B-1-a-1) | 2805 | 3130 |
| CHIMASSORB 944 (RTM) plus SANDUVOR 3050 (RTM) | 2030 | 2550 |
| CHIMASSORB 944 (RTM) plus SANDUVOR PR-31 (RTM) | 2400 | 2890 |

*)The overall concentration of the light stabilizers is 0.15%.

EXAMPLE 4

Light Stabilization of Polypropylene Homopolymer Films 100 parts of unstabilized polypropylene powder (melt flow index: 3.8 g/10 minutes at 230° C. and 2160 g) are homogenized at 200° C. for 10 minutes in a Brabender plastograph with 0.05 parts of pentaerythrityl tetrakis{3-(3,5-di-tert-butyl-4-hydroxyphenyl)propionate}, 0.05 parts of tris{2,4-di-tert-butylphenyl}phosphite, 0.1 parts of Ca stearate, 0.25 parts of titanium dioxide (anatase) and the light stabilizer system indicated in Tables 4A, 4B, 4C and 4D. The material thus obtained is compression molded in a laboratory press between two aluminum foils for 6 minutes at 260° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C.; without water-spraying).

Periodically, these samples are removed from the exposure apparatus and their carbonyl content is measured with an infrared spectrophotometer.

The exposure time ($T_{0.1}$) corresponding to the formation of a carbonyl absorbance of 0.1 is a measure for the efficiency of the light stabilizer system. The values obtained are summarized in the following Tables 4A, 4B, 4C and 4D.

TABLE 4A

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.09% each and the amount of TINUVIN 622 (RTM) is 0.02%*). |
|---|---|---|
| Without | 310 | |
| TINUVIN 770 (RTM) plus CHIMASSORB 944 (RTM) | 4520 | 5525 |
| TINUVIN 770 (RTM) plus CHIMASSORB 119 (RTM) | 4935 | 6255 |
| TINUVIN 770 (RTM) plus CYASORB UV 3346 (RTM) | 5980 | >6930 |
| TINUVIN 770 (RTM) plus UVASIL 299 HM (RTM) | 5365 | >6930 |
| TINUVIN 770 (RTM) plus UVASIL 2000 (RTM) | 5785 | 6805 |
| TINUVIN 770 (RTM) plus CYASORB UV 3529 (RTM) | 6010 | 6675 |
| TINUVIN 770 (RTM) plus UVINUL 5050 H (RTM) | 2720 | 3225 |

*)The overall concentration of the light stabilizers is 0.2%.

TABLE 4B

| Light stabilization system | $T_{0.1}$ in hours The amount of the light stabilizers used is 0.1% each*). | $T_{0.1}$ in hours Light stabilizer system in combination with Mixture (A-2) The amount of the stabilizers of the light stabilizer system is 0.075% each and the amount of Mixture (A-2) is 0.05%*). |
|---|---|---|
| Without | 310 | — |
| TINUVIN 770 (RTM) plus CHIMASSORB 944 (RTM) | 4520 | 5475 |
| TINUVIN 770 (RTM) plus UVINUL 5050 H (RTM) | 2720 | 3370 |

*)The overall concentration of the light stabilizers is 0.2%.

TABLE 4C

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.075% each and the amount of TINUVIN 622 (RTM) is 0.05%*). |
|---|---|---|
| Without | 315 | — |
| CHIMASSORB 944 (RTM) plus TINUVIN 765 (RTM) | 3775 | 4585 |
| CHIMASSORB 944 (RTM) plus TINUVIN 144 (RTM) | 3485 | 3990 |
| CHIMASSORB 944 (RTM) plus TINUVIN 123 (RTM) | 3055 | 3365 |
| CHIMASSORB 944 (RTM) plus HOSTAVIN N 20 (RTM) | 3335 | 4325 |
| CHIMASSORB 944 (RTM) plus HOSTAVIN N 24 (RTM) | 2795 | 3315 |
| CHIMASSORB 944 (RTM) plus ADK STAB LA 57 (RTM) | 4065 | 5110 |
| CHIMASSORB 944 (RTM) plus ADK STAB LA 62 (RTM) | 2725 | 3635 |
| CHIMASSORB 944 (RTM) plus ADK STAB LA 67 | 3045 | 3485 |
| CHIMASSORB 944 (RTM) plus GOODRITE UV 3150 (RTM) | 3300 | 4115 |
| CHIMASSORB 944 (RTM) plus Compound (B-6-a-1) | 4230 | 5125 |
| CHIMASSORB 944 (RTM) plus Compound (B-10-a-1) | 3745 | 4730 |
| CHIMASSORB 944 (RTM) plus SANDUVOR 3050 (RTM) | 2695 | 3280 |
| CHIMASSORB 944 (RTM) plus SANDUVOR PR-31 (RTM) | 2835 | 4070 |

*)The overall concentration of the light stabilizers is 0.2%.

TABLE 4D

| Light stabilizer system | $T_{0.1}$ in hours The amount of the light stabilizers used is 0.1% each*). | $T_{0.1}$ in hours Light stabilizer system in combination with Mixture (A-2) The amount of the stabilizers of the light stabilizer system is 0.075% each and the amount of Mixture (A-2) is 0.05%*). |
|---|---|---|
| Without | 315 | — |
| CHIMASSORB 944 (RTM) plus TINUVIN 765 (RTM) | 3775 | 4715 |
| CHIMASSORB 944 (RTM) plus SANDUVOR PR-31 (RTM) | 2835 | 3350 |

*)The overall concentration of the light stabilizers is 0.2%.

A further embodiment of this invention relates to a second stabilizer mixture containing (1) a component (AA-1) or (AA-2) as defined in the following, and (2) a component (B) or (C) as defined above.

The general disclosure described above also relates to this second stabilizer mixture (which is also useful for stabilizing an organic material against degradation induced by light, heat or oxidation) in appropriate manner.

The compounds of component (AA-1) are described for example in U.S. Pat. No. 4,609,698 which is incorporated by reference herein.

The compounds of component (AA-2) are described for example in EP-A-1,803 which is also incorporated by reference herein. Preferred compounds of component (AA-2) are FERRO AM 806 (RTM) or KOKANOX (RTM).

The weight ratio of the component (AA-1) or (AA-2) to the component (B) or (C) is preferably 10:1 to 1:100, in particular 10:1 to 1:10 or 5:1 to 1:5. Further examples for the weight ratio are also 1:1 to 1:10 such as 1:2 to 1:5.

The component (AA-1) or (AA-2) as well as the component (B) or (C) may be present in the material to be stabilized in an amount of preferably 0.005 to 5%, in particular 0.01 to 1% or 0.05 to 1%, relative to the weight of said material.

Component (AA-1) is a compound of the formula (AA-1-I) or (AA-1-II)

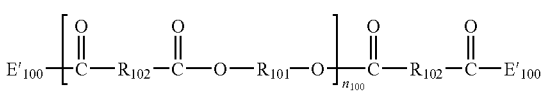

wherein $n_{100}$ is a number from 1 to 3, preferably 2;

the radicals $R_{101}$ independently of one another are $C_2$-$C_{18}$alkylene, $C_4$-$C_8$alkenylene, $C_4$-$C_{20}$monooxaalkylene, $C_4$-$C_{20}$polyoxaalkylene, $C_5$-$C_8$cycloalkylene, $C_7$-$C_{10}$cycloalkylene-dialkylene, $C_8$-$C_{20}$ phenylene-dialkylene or a group of the formula

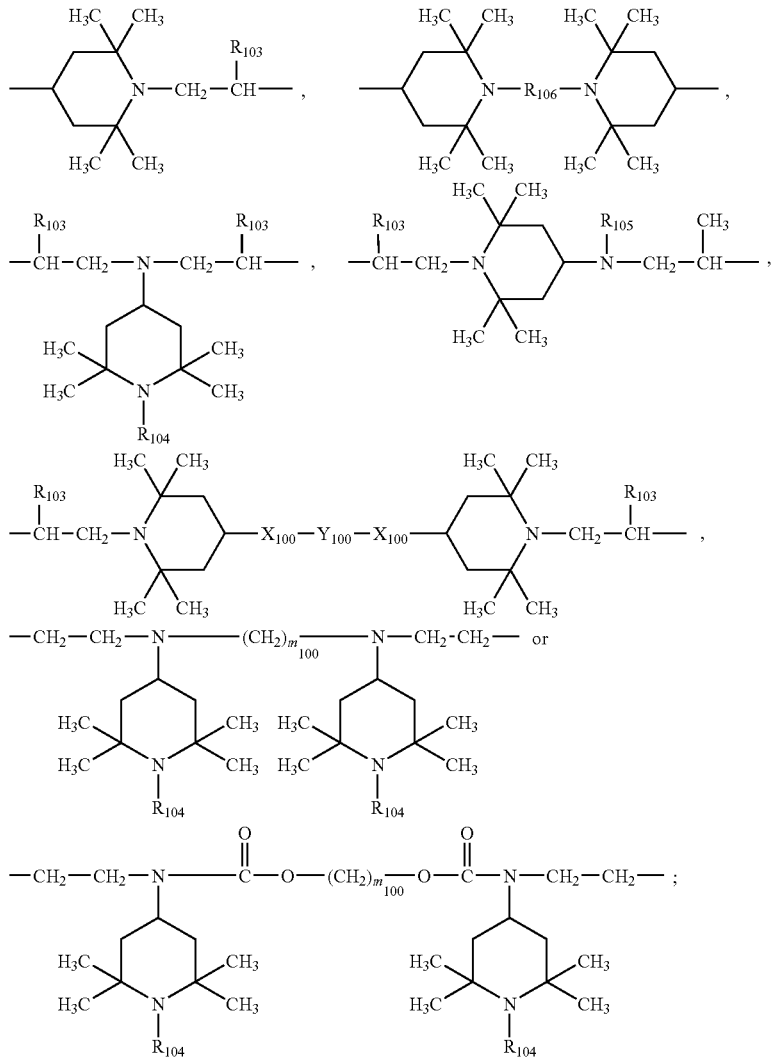

$m_{100}$ is an integer from 2 to 10;

$X_{100}$ is a group —O— or —$NR_{105}$—;

$Y_{100}$ is $C_2$-$C_{12}$alkylene, $C_4$-$C_{12}$alkylene interrupted by one or two —O— or —NH— groups; cyclohexylene, cyclohexylene-dimethylene, phenylene or phenylene-$Z_{100}$-phenylene with $Z_{100}$ being —O—, —$CH_2$— or —$SO_2$—;

the radicals $R_{102}$ independently of one another are a direct bond, $C_1$-$C_{18}$alkylene, $C_2$-$C_6$alkenylene, $C_5$-$C_8$cycloalkylene, $C_5$-$C_8$cycloalkenylene, phenylene, $C_7$-$C_{12}$phenylenealkylene or a group of the formula

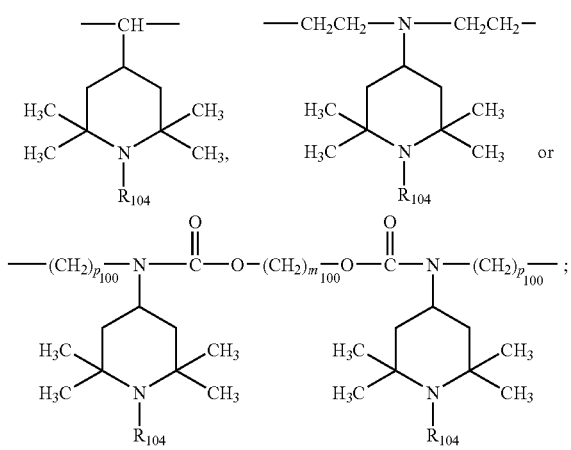

$p_{100}$ is 1 or 2;

$E_{100}$ is hydrogen, $C_1$-$C_8$alkyl, cyclohexyl, benzyl or an acyl group of the formula $R_{107}$—CO—, $R_{108}$—O—CO— or $(R_{109})(R_{110})N$—CO—;

$E'_{100}$ is a group $R_{111}O$— or $(R_{112})(R_{113})N$—;

$R_{103}$ is hydrogen, $C_1$-$C_6$alkyl, $C_2$-$C_7$alkoxymethyl, phenoxymethyl or tolyloxymethyl, $R_{104}$ is hydrogen, $C_1$-$C_8$alkyl, O, —OH, —$CH_2CN$, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, preferably hydrogen, $C_1$-$C_4$alkyl, $C_1$-$C_8$alkoxy or cyclohexyloxy, in particular hydrogen or methyl;

$R_{105}$ is hydrogen, $C_1$-$C_{12}$alkyl, cyclohexyl, phenyl, benzyl, phenylethyl or $C_1$-$C_8$acyl;

$R_{106}$ is $C_2$-$C_{12}$alkylene, $C_4$-$C_8$alkenylene or xylylene;

$R_{107}$ is $C_1$-$C_{12}$alkyl, $C_2$-$C_5$alkenyl, $C_5$-$C_8$cycloalkyl, phenyl, $C_7$-$C_{12}$phenylalkyl or a group of the formula (AA-1-III)

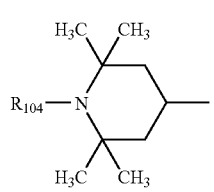
(AA-1-III)

$R_{108}$ is $C_1$-$C_{12}$alkyl, allyl, cyclohexyl or phenyl;

$R_{109}$ is hydrogen, $C_1$-$C_8$alkyl, allyl, cyclohexyl, phenyl or $C_7$-$C_{10}$alkylphenyl, $R_{110}$ is $C_1$-$C_8$alkyl, allyl, cyclohexyl, phenyl or $C_7$-$C_{10}$alkylphenyl; or $R_{109}$ and $R_{110}$ together with the N atom to which they are attached form a 5-membered to 7-membered heterocyclic ring;

$R_{111}$ is $C_1$-$C_{12}$alkyl, $C_3$-$C_5$alkenylmethyl, $C_5$-$C_8$cyloalkyl, phenyl, $C_7$-$C_{10}$alkylphenyl, $C_7$-$C_{12}$phenylalkyl, $C_3$-$C_{12}$alkoxyalkyl, a group —$(CH_2CH_2O)m_{100}$-$CH_3$, a group of the formula (AA-1-III) or a group of the formula (AA-1-IV);

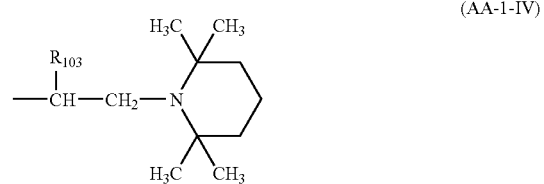
(AA-1-IV)

$R_{112}$ is $C_1$-$C_{12}$alkyl, allyl, cyclohexyl, phenyl, benzyl, $C_3$-$C_{12}$alkoxyalkyl, $C_4$-$C_{12}$dialkylaminoalkyl, a group of the formula (AA-1-III) or a group of the formula (AA-1-V);

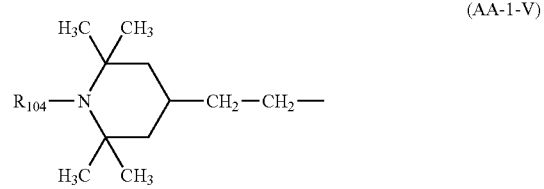
(AA-1-V)

$R_{113}$ is hydrogen, $C_1$-$C_{12}$alkyl, allyl, cyclohexyl or a group of the formula (III);

with the proviso that at least one of the radicals $R_{101}$, $R_{102}$, $E_{100}$ and $E'_{100}$ contains a group of the formula

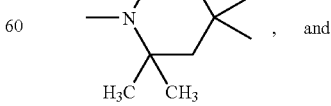
, and with the proviso that the repeating units in each of the formulae (AA-1-I) and (AA-1-II) can be identical or different.

Component (AA-2) is a compound of the formula (AA-2-I)

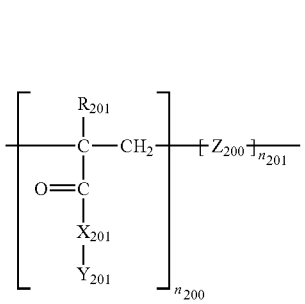

(AA-2-I)

in which $n_{200}$ and $n_{201}$ are independently of one another a number from 1 to 50;

$R_{201}$ is hydrogen or $C_1$-$C_4$alkyl;

$X_{201}$ is —O— or >N—$R_{202}$;

$R_{202}$ is hydrogen, $C_1$-$C_{12}$alkyl, cyclohexyl, phenyl, benzyl, phenylethyl or $C_1$-$C_8$acyl;

$Y_{201}$ is $C_1$-$C_4$alkyl or a group of the formula (AA-2-II);

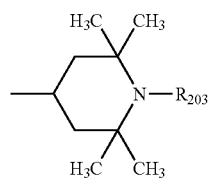

(AA-2-II)

$R_{203}$ is hydrogen, $C_1$-$C_8$alkyl, O, —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, preferably hydrogen, $C_1$-$C_4$alkyl, $C_1$-$C_8$alkoxy or cyclohexyloxy, in particular hydrogen or methyl;

$Z_{200}$ is ethylene or a group of the formula (AA-2-III)

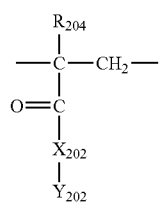

(AA-2-III)

$R_{204}$ is hydrogen or $C_1$-$C_4$alkyl;

$X_{202}$ has one of the meanings of $X_{201}$;

$Y_{202}$ is $C_1$-$C_{18}$alkyl or a group of the formula (AA-2-II);

with the provisos that the repeating units in the formula (AA-2-I) have a block or random distribution and that each of the repeating units

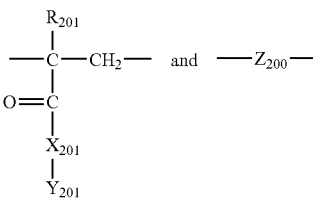

in the formula (AA-2-I) can be identical or different, and with the proviso that at least 2%, preferably at least 5%, of the repeating units in the formula (AA-2-I) contain a group of the formula (AA-2-II).

In the compounds of the formula (AA-2-I), the end groups are for example hydrogen or a group —CH=C($R_{201}$)—CO—$X_{201}$—$Y_{201}$.

All stabilizer mixtures described in this application are further useful as light stabilizers for coatings. A use in combination with an UV absorber is preferred. Suitable coatings are for example described in U.S. Pat. No. 6,117,997, column 26, line 55 to column 32, line 21.

The example below illustrates the use of the second stabilizer mixtures. All percentages and parts are by weight, unless stated otherwise.

EXAMPLE A

Light Stabilization of Polypropylene Homopolymer Films 100 parts of unstabilized polypropylene powder (melt flow index: 3.2 g/10 min at 230° C. and 2160 g) are homogenized at 200° C. for 10 min in a Brabender plastograph with 0.05 parts of pentaerythrityl-tetrakis{3-(3,5-di-tert-butyl-4-hydroxyphenyl)propionate}, 0.05 parts of tris{2,4-di-tert-butylphenyl}phosphite, 0.1 parts of Ca stearate, 0.25 parts of titanium dioxide (Anatase) and the stabilizer mixture indicated in Tables 3a and 3b. The material thus obtained is compression molded in a laboratory press between two aluminum foils for 6 min at 260° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C., without water-spraying).

Periodically, these samples are removed from the exposure apparatus and their carbonyl content is measured with an infrared spectrophotometer. The exposure time corresponding to formation of a carbonyl absorbance of 0.1 is a measure for the efficiency of the stabilizer mixture. The values obtained are summarized in Tables 3a and 3b.

TABLE 3a

| Stabilizer mixture | Time in hours until 0.1 carbonyl absorbance |
|---|---|
| 0.05% of (AA-1-II-1-A) and 0.05% of TINUVIN 770 (RTM) | 1585 |
| 0.05% of (AA-1-II-2-A) and 0.05% of TINUVIN 770 (RTM) | 2485 |
| 0.05% of (AA-1-II-3-A) and 0.05% of TINUVIN 770 (RTM) | 2415 |
| 0.05% of (AA-1-II-4-A) and 0.05% of TINUVIN 770 (RTM) | 2100 |

TABLE 3a-continued
| Stabilizer mixture | Time in hours until 0.1 carbonyl absorbance |
|---|---|
| 0.05% of (AA-1-II-5-A) and 0.05% of TINUVIN 770 (RTM) | 1895 |
TABLE 3b
| Stabilizer mixture | Time in hours until 0.1 carbonyl absorbance |
|---|---|
| 0.05% of (AA-2-I-3-A) and 0.05% of TINUVIN 770 (RTM) | 2125 |
Stabilizers used:
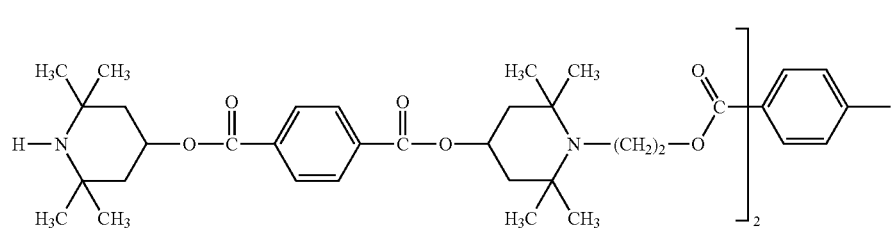
(= AA-1-II-1-A)
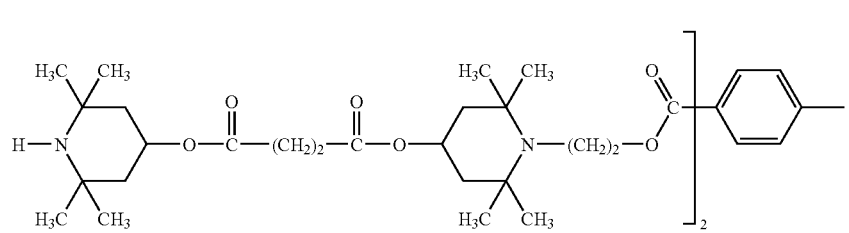
(= AA-1-II-2-A)
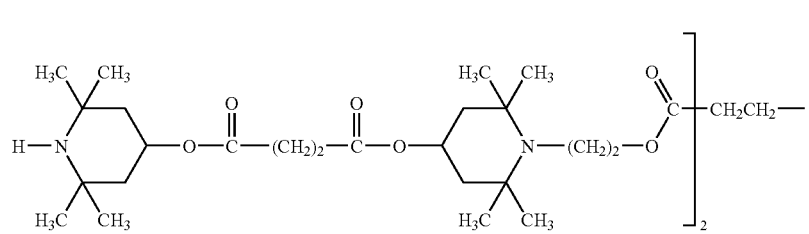
(= AA-1-II-3-A)
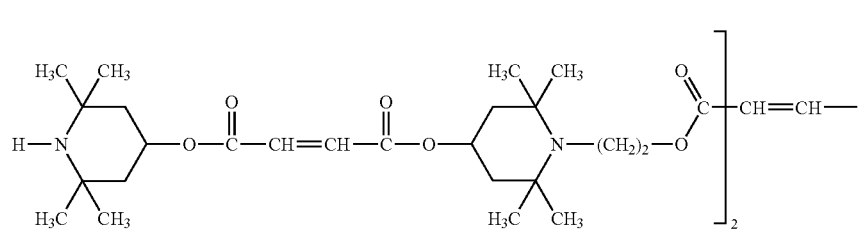
(= AA-1-II-4-A)
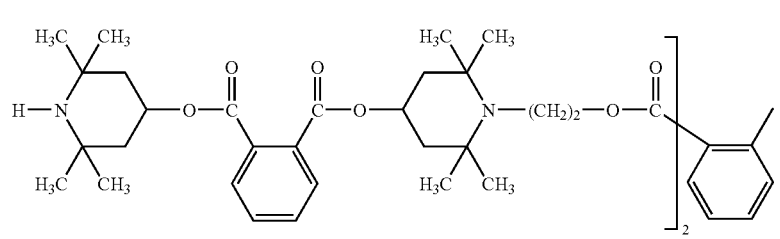
(= AA-1-II-5-A)

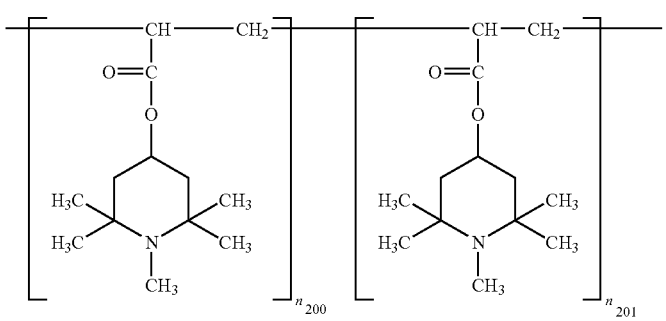

with the sum of $n_{200}$ and $n_{201}$ being a number from 2 to 20.

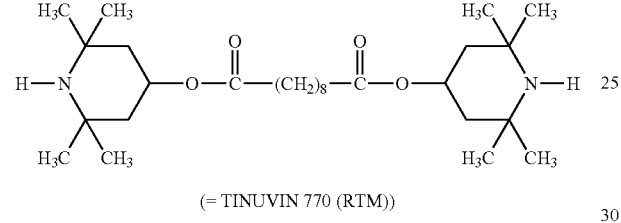

(= TINUVIN 770 (RTM))

The invention claimed is:

1. A stabilizer mixture containing the components (A), (B) and (C) wherein component (A) is a compound selected from the group consisting of formulae (A-1-a), (A-2-a) and (A-2-b);

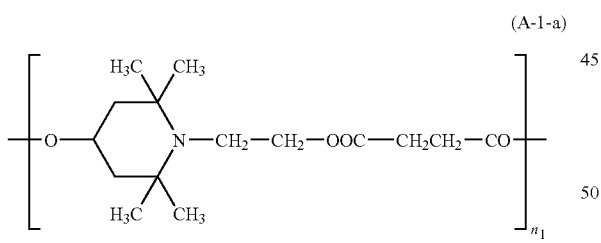

wherein $n_1$ is a number from 2 to 20;

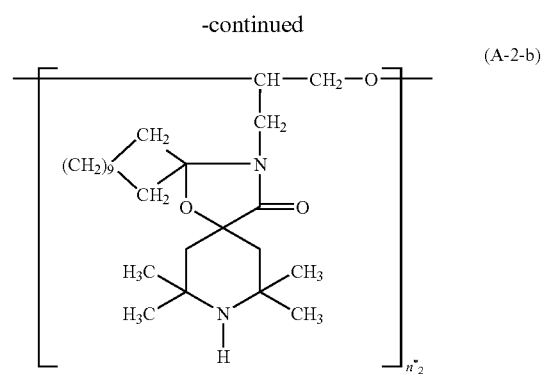

wherein $n_2$ and $n_2^*$ are a number from 2 to 20;

component (B) is a compound selected from the group consisting of the formula (B-1-a), (B-1-b), (B-1-c), (B-1-d), (B-8-a), and (B-10-a);

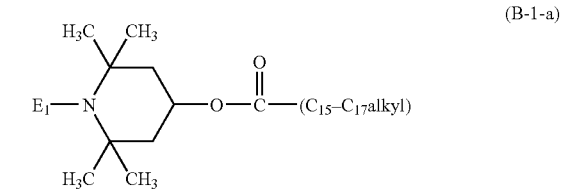

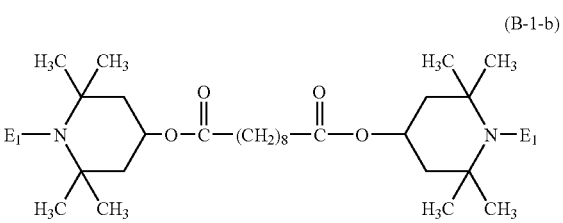

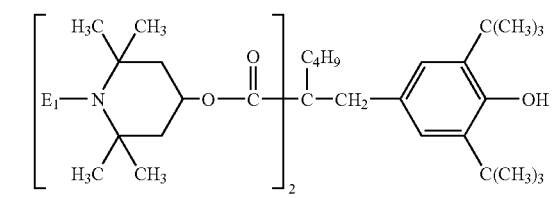

-continued (B-1-d)

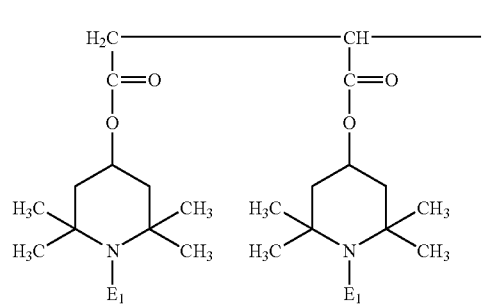

wherein $E_1$ is hydrogen, $C_1$-$C_8$alkyl, O, —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl;

(B-8-a)

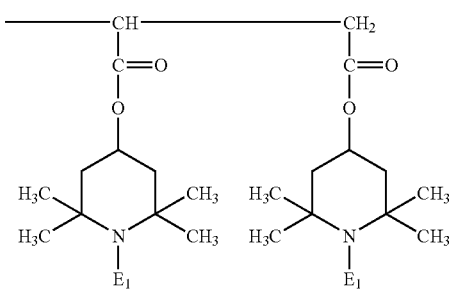

wherein $E_{23}$ has one of the meanings of $E_1$;

(B-10-a)

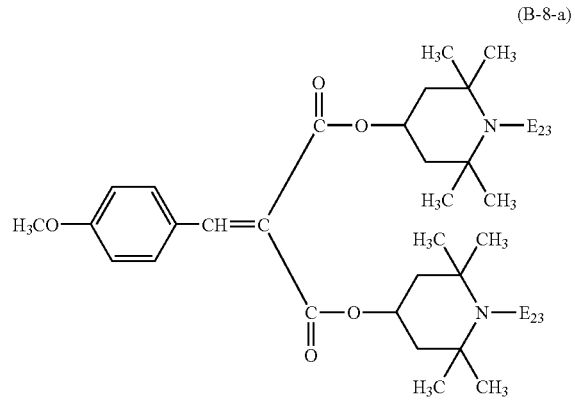

wherein $E_{29}$ has one of the meanings of $E_1$; and
component (C) is a compound selected from the group consisting of the formula (C-1-a), (C-1-b), (C-1-c), (C-1-d), (C-2-a), (C-4-a), and a product (C-6-a);

(C-1-a)

(C-1-b)

(C-1-c)

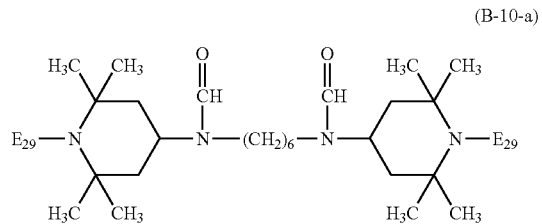

-continued

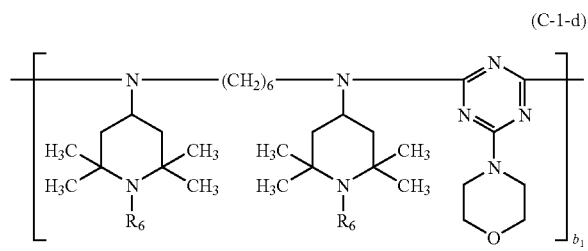
(C-1-d)

wherein $b_1$ is a number from 2 to 20 and $R_6$ is hydrogen, $C_1$-$C_8$alkyl, O, —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl;

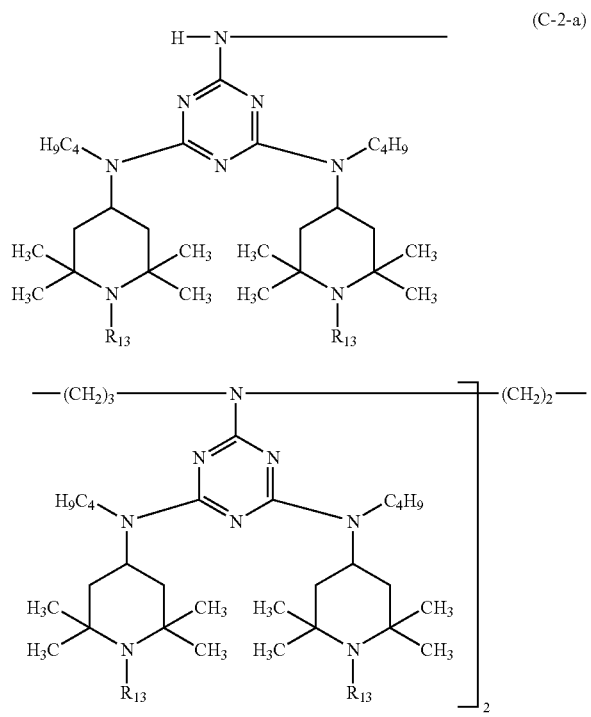
(C-2-a)

wherein $R_{13}$ has one of the meanings of $R_6$, (C-4-a)
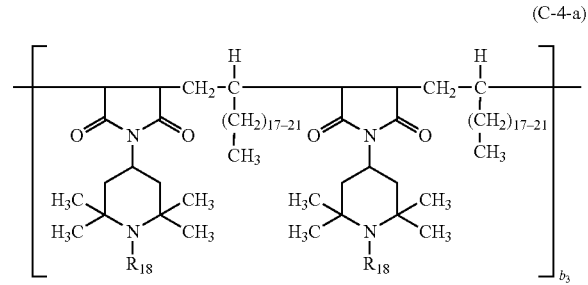

wherein $b_3$ is a number from 1 to 20 and $R_{18}$ has one of the meanings of $R_6$;

a product (C-6-a) represented by the formula

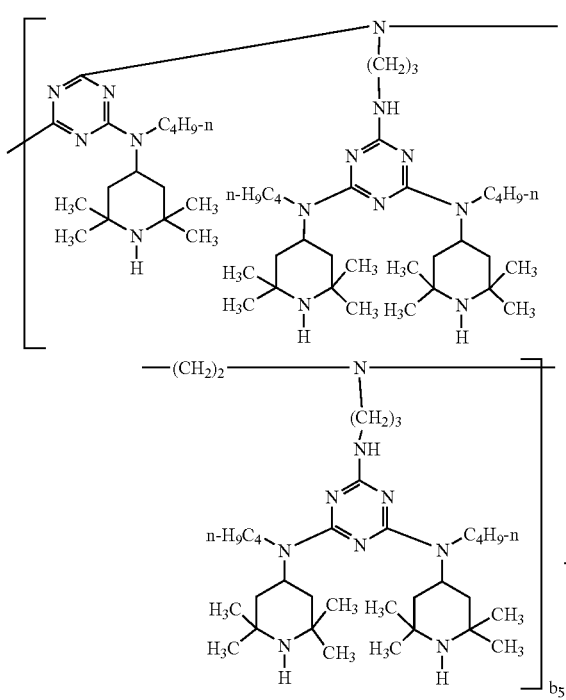

wherein $b_5$ is 2 to 20.

2. A stabilizer mixture according to claim 1 wherein $E_1$, $E_{23}$ and $E_{29}$ are hydrogen, $C_1$-$C_4$alkyl, $C_1$-$C_{10}$alkoxy, cyclohexyloxy, allyl, benzyl or acetyl.

3. A stabilizer mixture according to claim 1 wherein $R_6$, $R_{13}$, and $R_{18}$ are hydrogen, $C_1$-$C_4$alkyl, $C_1$-$C_{10}$alkoxy, cyclohexyloxy, allyl, benzyl or acetyl.

4. A stabilizer mixture according to claim 1 wherein $E_1$, $E_{23}$, $E_{29}$, $R_6$, $R_{13}$, $R_{16}$ and $R_{18}$ are hydrogen or methyl and $E_1$ and $R_6$ additionally are $C_1$-$C_8$alkoxy.

5. A stabilizer mixture according to claim 1 wherein component (A) is a compound selected from the group consisting of the formula (A-1-a) wherein $n_1$ is a number from 2 to 20, and a compound of the formula (A-2-a) or (A-2-b) wherein $n_2$ and $n_2$* are a number from 2 to 20, component (B) is a compound of the formula (B-1-b) wherein $E_1$ is hydrogen and component (C) is a compound selected from the group consisting of the formula (C-1-a) wherein $b_1$ is a number from 2 to 20 and $R_6$ is hydrogen, a compound of the formula (C-1-b) wherein $R_6$ is hydrogen or propoxy and $b_1$ is a number from 2 to 20, a compound of the formula (C-1-d) wherein $R_6$ is hydrogen or methyl and $b_1$ is a number from 2 to 20, a compound of the formula (C-2-a) wherein $R_{13}$ is methyl, or a compound of the formula (C-4-a) wherein $R_{18}$ is hydrogen and $b_3$ is a number from 1 to 20, and a product (C-6-a).

6. A stabilizer mixture according to claim 1 wherein component (A) is a compound selected from the group consisting of the formula (A-1-a) wherein $n_1$ is a number from 2 to 20, and a compound of the formula (A-2-a) and (A-2-b) wherein $n_2$ and $n_2$* are a number from 2 to 20, component (B) is a compound of the formula (B-1-b) wherein $E_1$ is hydrogen and component (C) is a compound of the formula (C-1-a) wherein $b_1$ is a number from 2 to 20 and $R_6$ is hydrogen.

7. A stabilizer mixture according to claim 1 wherein component (A) is a compound of the formula (A-1-a), component (B) is a compound of the formula (B -1-b)

with $E_1$ being hydrogen and component (C) is a compound of the formula (C-1-a) with $R_6$ being hydrogen;

component (A) is a compound of the formula (A-1-a), component (B) is a compound of the formula (B-1-b) with $E_1$ being octyloxy and component (C) is a compound of the formula (C-1-a) with $R_6$ being hydrogen;

component (A) is a compound of the formula (A-1-a), component (B) is a compound of the formula (B-10-a) with $E_{29}$ being hydrogen and component (C) is a compound of the formula (C-1-a) with $R_6$ being hydrogen; or component (A) is a compound of the formula (A-1-a), component (B) is a compound of the formula (B-1-b) with $E_1$ being methyl and component (C) is a compound of the formula (C-2-a) with $R_{13}$ being methyl.

8. A composition comprising an organic material subject to degradation induced by light, heat or oxidation and a stabilizer mixture according to claim 1.

9. A composition according to claim 8 wherein the organic material is a synthetic polymer.

10. A composition according to claim 8 wherein the organic material is a polyolefin.

11. A composition according to claim 8 wherein the organic material is polyethylene, polypropylene, a polyethylene copolymer or a polypropylene copolymer.

12. A method for stabilizing an organic material against degradation induced by light, heat or oxidation, which comprises incorporating into the organic material a stabilizer mixture according to claim 1.

* * * * *

UNITED STATES PATENT AND TRADEMARK OFFICE
CERTIFICATE OF CORRECTION

PATENT NO. : 7,628,936 B2
APPLICATION NO. : 11/452143
DATED : December 8, 2009
INVENTOR(S) : François Gugumus It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 92 days.

Signed and Sealed this

Second Day of November, 2010

David J. Kappos
*Director of the United States Patent and Trademark Office*